US009016666B2

(12) United States Patent
Xia

(10) Patent No.: US 9,016,666 B2
(45) Date of Patent: Apr. 28, 2015

(54) LOAD SENSING TRANSMISSION AND HOISTING MACHINE INCLUDING THE SAME

(75) Inventor: Desheng Xia, Nakakoma-gun (JP)

(73) Assignee: Kojun-Tech LLC, Yamanashi (JP)

( * ) Notice: Subject to any disclaimer, the term of this patent is extended or adjusted under 35 U.S.C. 154(b) by 125 days.

(21) Appl. No.: 13/809,504

(22) PCT Filed: Oct. 21, 2011

(86) PCT No.: PCT/JP2011/074246
§ 371 (c)(1),
(2), (4) Date: Jan. 10, 2013

(87) PCT Pub. No.: WO2012/053628
PCT Pub. Date: Apr. 26, 2012

(65) Prior Publication Data
US 2013/0105751 A1    May 2, 2013

(30) Foreign Application Priority Data

Oct. 22, 2010 (JP) ................................ 2010-236992

(51) Int. Cl.
| | | |
|---|---|---|
| *B66D 1/50* | (2006.01) | |
| *F16D 11/16* | (2006.01) | |
| *B66D 3/16* | (2006.01) | |
| *B66D 3/12* | (2006.01) | |

(52) U.S. Cl.
CPC ...... *F16D 11/16* (2013.01); *B66D 3/16* (2013.01); *B66D 3/12* (2013.01)

(58) Field of Classification Search
USPC .................. 254/273–275, 344–346, 358, 372
See application file for complete search history.

(56) References Cited

U.S. PATENT DOCUMENTS

| | | | | |
|---|---|---|---|---|
| 4,605,111 | A * | 8/1986 | Ohno et al. ...................... 192/16 |
| 5,647,576 | A * | 7/1997 | Kataoka ......................... 254/352 |
| 6,062,543 | A * | 5/2000 | Kobayasi et al. .............. 254/372 |
| 6,224,039 | B1 * | 5/2001 | Okamoto et al. ............. 254/346 |
| 6,554,255 | B2 * | 4/2003 | Fujikawa ....................... 254/358 |

FOREIGN PATENT DOCUMENTS

| | | |
|---|---|---|
| JP | 40-005137 B1 | 3/1965 |
| JP | 48-023140 B1 | 7/1973 |

(Continued)

OTHER PUBLICATIONS

First office action, dated Sep. 19, 2014. In corresponding application No. 2011800319488.

*Primary Examiner* — Emmanuel M Marcelo
*Assistant Examiner* — Angela Caligiuri
(74) *Attorney, Agent, or Firm* — Browdy and Neimark, PLLC

(57) ABSTRACT

A load sensing transmission device in which when a rotation is transmitted to a sun gear, and planetary gears are rotated, if the rotation of an internally-toothed ring gear disposed at an outer circumference of the planetary gears is restricted in at least one direction, a decelerated rotation is output from a planetary carrier by revolution of the planetary gears. When the internally-toothed ring gear is rotated without being restricted, and simultaneously rotated together with the revolution of the planetary gears the rotation which is not decelerated is output from the planetary carrier. Existence and non-existence of the restriction of the rotation of the internally-toothed ring gear are switched by sensing a load by the load sensing mechanism and performing the engagement and disengagement by an engagement pawl. The rotation of the planetary carrier is output through a plate with slider, load springs, and a plate with cam.

15 Claims, 9 Drawing Sheets

(56) References Cited

FOREIGN PATENT DOCUMENTS

| JP | 54-151250 A | 11/1979 |
| JP | S54-151250 A | 11/1979 |
| JP | 2001-146391 A | 5/2001 |
| JP | 2010-116957 A | 5/2010 |

* cited by examiner

LOAD SENSING TRANSMISSION AND HOISTING MACHINE INCLUDING THE SAME

TECHNICAL FIELD

The present invention relates to a load sensing transmission capable of accomplishing speed up of work by changing lifting and lowering speeds of a load depending on high and low weights of the load when applying the load sensing transmission to a hoisting machine that lifts the load, and so on, and a hoisting machine including the load sensing transmission.

BACKGROUND ART

In general, in a hoisting machine, a gear mechanism configured to be capable of lifting a heavy load with a small force is provided between a hand wheel rotated by an operation of a hand chain and a load sheave to move up and down a load chain to which a load is applied. Because the gear mechanism in the hoisting machine is a decelerating mechanism to decelerate a rotation of the hand wheel and transmit the decelerated rotation to the load sheave, the rotation of the load sheave is always decelerated regardless of existence and non-existence of a load. This results in the lowering of work efficiency.

Therefore, it is proposed to provide a variable speed mechanism to be variable the rotation speed of the load sheave depending on existence and non-existence or high or low of a load. For example, there is proposed an automatic transmission which includes a first clutch means to transmit as is a rotation from a hand wheel, a second clutch means to transmit to a speed increasing mechanism, and a transmitting plate to engage and disengage the first clutch means and the second clutch means, and when a load is applied to the load sheave, wherein the first the transmitting plate is moved to engage the first clutch means and disengage the second clutch means, the winding up speed of the load chain is switched from a high speed to a low speed, if no load is applied, the second clutch means is engaged so that the winding up speed is at a high speed (see Patent Document 1).

In the automatic transmission, because the transmitting plate is axially moved to press the first clutch means and the second clutch means and press-fit them, and thereby a speed is switched, there is a problem that a switching resistance is large and operational sensing is poor. In addition, because the transmitting plate and so on are disposed axially and moved axially, there are problems that the transmission becomes axially large in size, only one side of the hoisting machine is heavy so that the hoisting machine becomes unbalance, and the hoisting machine is difficult to be operated due to inclination of the hoisting machine, because the transmission is disposed between the hand wheel and a break.

Moreover, in addition to this, there is proposed a load sensing-type transmission which includes a low speed rotation member, a high speed rotation member, and an output rotation member, wherein a magnetic body is provided on each of the foregoing members, and the members are mechanically engaged, after the magnetic bodies are magnetically engaged (see Patent Document 2).

However, in this transmission, an unstable engagement state due to a magnetic force is generated when a speed is switched, and therefore there is risk of idling. In addition, in the transmission, parts having complicate shapes formed by the magnetic bodies are frequently used; there is a problem that the transmission has a complicate structure, a large weight, and a high cost. In addition, even in the transmission, because the parts are axially disposed and moved axially, there are problems that the transmission is large in size and a balance of the transmission is poor when the transmission is applied to the hoisting machine. In particular, because the transmission is disposed between the hand wheel and the break, balance is very poor.

RELATED ARTS

Patent Documents

Patent Document 1: JP2001-146391A
Patent Document 2: JP2010-116957A

SUMMARY OF THE INVENTION

Problems to be Solved by the Invention

An object of the present invention is to solve the problems of the foregoing background arts and provide a load sensing transmission which is a compact size and a lightweight, and capable of accomplishing a smooth switching of speed and a safety and secure switching because there is no neutral position in which a rotational direction does not determine when a rotation speed is switched, and a hoisting machine including the load sensing transmission.

Means to Solve the Problems

One objection of the present embodiments is to provide a load sensing transmission in which a size is miniaturized, a light weight and a smooth speed switching are acquired, and because there is no neutral state when rotation speed is switched, safe and secure switching is acquired, and a hoisting machine including the load sensing transmission.

When a rotation is transmitted to a sun gear through a pinion shaft, and planetary gears are rotated, if the rotation of an internally-toothed ring gear disposed at an outer circumference of the planetary gears is restricted in at least one direction, a decelerated rotation is output from a planetary carrier by revolution of the planetary gears, and when the internally-toothed ring gear is rotated without being restricted, and simultaneously rotated together with the revolution of the planetary gears, the rotation which is not decelerated is output from the planetary carrier. Existence and non-existence of the restriction of the rotation of the internally-toothed ring gear are switched by sensing a load by a load sensing mechanism and performing the engagement and disengagement by an engagement pawl. The rotation of the planetary carrier is output through a plate with slider, load springs, and a plate with a cam.

A load sensing transmission of the present invention inputs an external rotation and outputs a low speed or a high speed switched depending on a high load or a low load. The load sensing transmission includes a variable speed mechanism to decelerate the input external rotation and transmit it as a low speed or to transmit as is the input external rotation as a high speed; a load sensing mechanism to sense a high load or a low load of an output side of the variable speed mechanism; and a switching mechanism, which is driven by the load sensing mechanism, to switch an output rotation of the variable speed mechanism to a low speed state or a high speed state by engaging with or disengaging from the variable speed mechanism.

The variable speed mechanism in the load sensing transmission includes a central rotation member that input the external rotation, and an inner rotation member and an outer rotation member that vary the rotation of the central rotation member, the central rotation member, the inner rotation member, and the outer rotation member being relative rotatable, in conjunction with the switching mechanism, if the rotation of one of the inner rotation member and the outer rotation member is restricted, a low speed rotation which has the same rotational direction as the central rotation member and which is lower than the central rotation member is output from the other of the inner rotation member and the outer rotation member, and if the rotational restriction of one of the outer rotation member and the inner rotation member is released, a high speed rotation which has the same rotational direction as the central rotation member and which has the same rotating speed as that of the central rotation member is output from the other of the inner rotation member and the outer rotation member.

The switching mechanism includes a rotational restriction-switching mechanism to switch the rotational restriction of the outer rotation member or the inner rotation member of the variable speed mechanism and the release of the rotational restriction, and a connection switching mechanism to switch any combination of the outer rotation member and the inner rotation member, the outer rotation member and the central rotation member, the central rotation member and the inner rotation member in an impossible relative rotation state by connecting them through the load sensing mechanism at the time of the release of the rotational restriction and in a possible relative rotation state by releasing the connection at the time of the rotational restriction.

The load sensing mechanism includes a holding mechanism to maintain the high speed state until a load exceeds an upper limit of a predetermined load variation range when the load sensing mechanism senses a low speed switching load in case of the switching from the high speed to the low speed to switch the switching mechanism from the high speed state to the low speed state, and to maintain the low speed state until a load lowers below a lower limit of the load variation range when the load sensing mechanism senses a high speed switching load in case of the switching from the low speed to the high speed to switch the switching mechanism from the low speed state to the high speed state.

The load sensing mechanism includes a slider to switch the switching mechanism, a pair of plate members which are provided together in a relatively rotatable state in a certain range and one or both of which are driven by the variable speed mechanism, and which are relatively rotated by an external load, a load resilient member which is provided between the pair of plate members and deformed by the relative rotation of the plate members, and a cam mechanism to place the slider in a movable state to a low speed switching position when the pair of plate members are relatively rotated by deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed.

The load sensing mechanism includes a holding mechanism to hold a position of the slider, the holding mechanism includes a locking mechanism provided on one of the pair of plate members together with slider and locking the slider by engaging with slider when the slider arrives at the high speed switching position or at the low speed switching position, and an unlocking mechanism provided on the other of the pair of plate members and unlocking the locking mechanism and moving the slider to the low speed switching position or the high speed switching position, when the slider is in the movable state to the low speed switching position or the high speed switching position by the cam mechanism and a load exceeding the upper limit of the predetermined load variation range or lowering below the lower limit thereof.

One of the slider and the cam mechanism includes a resilient member in contact with the other of the slider and the cam mechanism, and capable of maintaining the holding of the slider by the holding mechanism in the predetermined load variation range while imparting a force capable of moving the slider in a radial direction to the slider by the resilient member.

The switching mechanism includes an inner concave portion provided to face the slider and in which the slider is movably inserted, side walls of the inner concave portion are set such that one side wall in contact with the slider due to a load is inclined significantly than the other side wall.

The variable speed mechanism outputs a low speed rotation which has a rotating speed lower than that of the central rotation member and is the same rotational direction as that of the central rotation member from the inner rotation member when the rotational restriction of the outer rotation member is performed, or a high speed rotation which is the same rotating speed as that of the central rotation member and is the same rotational direction as that of the central rotation member from the inner rotation member when the rotational restriction is released.

The load sensing mechanism includes a pair of plate members which are provided together in a relatively rotatable state in a certain range and relatively rotated when one of the plate members is driven by the inner rotation member of the variable speed mechanism and the exterior load is applied to the other of the plate member.

The switching mechanism performs the rotational restriction of the outer rotation member together with disengaging the connection of the inner rotation member and the outer rotation member when the slider is moved to the low speed switching position, and releases the rotational restriction of the outer rotation member together with performing the connection of the inner rotation member and the outer rotation member through the load sensing mechanism when the slider is moved to the high speed switching position.

The variable speed mechanism outputs a low speed rotation which has a rotating speed lower than that of the central rotation member and is the same rotational direction as that of the central rotation member from the inner rotation member when the rotational restriction of the outer rotation member is performed, or a high speed rotation which is the same rotating speed as that of the central rotation member and is the same rotational direction as that of the central rotation member from the inner rotation member when the rotational restriction is released.

The load sensing mechanism includes a pair of plate members which are provided together in a relatively rotatable state in a certain range, one of the plate members being driven by the outer rotation member of the variable speed mechanism and the other being engaged with or disengaged from the inner rotation member, and the plate members being relatively rotated by the relative rotation of the outer rotation member and the inner rotation member generated by an exterior load.

The switching mechanism performs the rotational restriction of the outer rotation member together with disengaging the connection of the inner rotation member and the outer rotation member when the slider is moved to the low speed switching position, and releases the rotational restriction of the outer rotation member together with performing the connection of the inner rotation member and the outer rotation member through the load sensing mechanism when the slider is moved to the high speed switching position.

The variable speed mechanism outputs a low speed rotation which has a rotating speed lower than that of the central rotation member and is the same rotational direction as that of the central rotation member from the inner rotation member when the rotational restriction of the outer rotation member is performed, or a high speed rotation which is the same rotating speed as that of the central rotation member and is the same rotational direction as that of the central rotation member from the inner rotation member when the rotational restriction is released.

The load sensing mechanism includes a pair of plate members which are provided together in a relatively rotatable state in a certain range, one of the plate members being driven by the outer rotation member of the variable speed mechanism and the other being engaged with or disengaged from the central rotation member, and the plate members being relatively rotated by an the relative rotation of the outer rotation member and the central rotation member generated by an exterior load.

The switching mechanism performs the rotational restriction of the outer rotation member together with disengaging the connection of the central rotation member and the outer rotation member when the slider is moved to the low speed switching position, and releases the rotational restriction of the outer rotation member together with performing the connection of the center rotation member and the outer rotation member through the load sensing mechanism when the slider is moved to the high speed switching position.

The variable speed mechanism outputs a low speed rotation which has a rotating speed lower than that of the central rotation member and is the same rotational direction as that of the central rotation member from the outer rotation member when the rotational restriction of the inner rotation member is performed, or a high speed rotation which is the same rotating speed as that of the central rotation member and is the same rotational direction as that of the central rotation member from the outer rotation member when the rotational restriction is released.

The load sensing mechanism includes a pair of plate members which are provided together in a relatively rotatable state in a certain range, one of the plate members is driven by the inner rotation member of the variable speed mechanism and the other of the plate members being engaged with or disengaged from the central rotation member, and the plate members being relatively rotated by the relative rotation of the inner rotation member and the central rotation member generated by an exterior load applied.

The switching mechanism performs the rotational restriction of the inner rotation member together with disengaging the connection of the inner rotation member and the central rotation member when the slider is moved to the low speed switching position, and releases the rotational restriction of the inner rotation member together with performing the connection of the inner rotation member and the central rotation member through the load sensing mechanism when the slider is moved to the high speed switching position.

The variable speed mechanism outputs a low speed rotation which has a rotating speed lower than that of the central rotation member and is the same rotational direction as that of the central rotation member the outer rotation member when the rotational restriction of the inner rotation member is performed, or a high speed rotation which is the same rotating speed as that of the central rotation member and is the same rotational direction as that of the central rotation member from the outer rotation member when the rotational restriction is released.

The load sensing mechanism includes a pair of plate members which are provided together in a relatively rotatable state in a certain range, one of the plate members being driven by the inner rotation member of the variable speed mechanism and the other being engaged with or disengaged from the outer rotation member, and the plate members being relatively rotated by the relative rotation of the inner rotation member and the outer rotation member generated by an exterior load applied.

The switching mechanism performs the rotational restriction of the inner rotation member together with disengaging the connection of the inner rotation member and the outer rotation member when the slider is moved to the low speed switching position, and releases the rotational restriction of the inner rotation member together with performing the connection of the inner rotation member and the outer rotation member through the load sensing mechanism when the slider is moved to the high speed switching position.

On the other hand, a hoisting machine including the load sensing transmission according to the present invention includes a hand wheel rotated by an operation of a hand chain; a load sheave to perform up and down movement of a load chain suspending a load; a variable speed mechanism to which a rotation of the hand wheel is transmitted and which decelerates the rotation to transmit as a low speed rotation, or transmits as is as a high speed rotation; a load sensing mechanism to sense a high load or a low load applied to the load sheave by a rotational output of the variable speed mechanism; a switching mechanism driven by the load sensing mechanism and configured to switch the output rotation of the variable speed mechanism to the low speed state or the high speed state by engaging with or disengaging from the variable speed mechanism. Further, the hoisting machine can also be designed to comprise speed reduction gears provided between the load sheave and the variable speed mechanism.

Effects of the Invention

As a variable speed mechanism according to the present invention, there are a planetary gear train, an internal contact-type planetary gear train and a cycloidal gear train and so on. An internally-toothed ring gear, a planetary carrier, and a sun gear of the planetary gear train correspond to an outer rotation member, an inner rotation member, and a central rotation member, respectively.

An outer low speed ring, an inner low speed carrier, and a central high speed crank of the internal contact-type planetary gear train and the cycloidal gear train correspond to the outer rotation member, the inner rotation member, and the central rotation member, respectively. In addition, in the load sensing transmission according to the present invention, the central rotation member is set as an input side of rotation, by restricting the rotation of the outer rotation member of the planetary gear train, and the rotation of the inner rotation member of the internal contact-type planetary gear train and the cycloidal gear train, from the other thereof, a low speed rotation having the same rotational direction as in the central rotation member is output. By releasing the rotational restriction, a high speed rotation which is the same rotational direction as in the central rotation member is output. The rotational restriction is performed as follows, by moving a slider of a load sensing mechanism radially, a engagement pawl and a clutch ring of a switching mechanism are engaged or disengaged, thereby the rotational restriction or the release of the outer rotation member or the inner rotation member is performed directly or through the load sensing mechanism. Simultaneously, by the movement of the slider of the load sensing mechanism, a ring with engagement pawl or plate with engagement groove and a part of the slider are engaged, and any combination of the outer rotation member and the inner rotation member, the outer rotation member and the central rotation member, and the inner rotation member and the central rotation member are connected through the load sensing mechanism and with the integration with the central rotation member, a high speed rotation is output.

In this way, with a very simple structure, the variable speed can be accomplished, and reduction in size and weight can be accomplished without increasing a size in an axial direction.

Also, in the load sensing transmission according to the present invention, when the slider of the load sensing mechanism is switched between a low speed switching position and a high speed switching position, because a position of the slider is held by a holding mechanism, it is possible to stabilize an operation at the time of switching of a high-low speed tending to be unstable, and perform the switching rapidly, smoothly and securely.

Also, the load sensing mechanism, the variable speed mechanism, and the switching mechanism in the load sensing transmission according to the present invention, it is possible to change an arrangement in an axial direction depending on a use because a method of the connection and the engagement can be changed variously. In particular, the load sensing mechanism and the switching mechanism may be disposed in an inner portion of a case far away than the variable speed mechanism from portions in which water or dust is easy to be entered, such as the input side of the rotation. It is possible to change to a device having a most suitable structure depending on a use.

Also, the slider in the load sensing transmission according to the present invention is provided with at a top portion thereof a resilient member which is in contact with a cam mechanism. A radial position of the slider by the holding mechanism is maintainable in a predetermined load variation range. Therefore, it is possible to stabilize further a switching operation, and prevent an unstable neutral state from occurring and accomplish a smooth operation. The resilient member may be provided on the cam mechanism instead of the top portion of the slider.

Also, in the load sensing transmission according to the present invention, by disposing the load sensing mechanism, it is possible to buffer a change in torque of the input side by the speed switching and prevent an excess variation of the input side from occurring to stabilize and enhance stability and operability of the speed switching.

Also, in the hoisting machine including the load sensing transmission according to the present invention, the load sensing transmission is provided between the other end of the pinion shaft to which the hand wheel is attached and the load sheave, it is possible to provide a compact hoisting machine having a good balance even if a load is not applied.

EMBODIMENTS OF THE INVENTION

Figure 1:
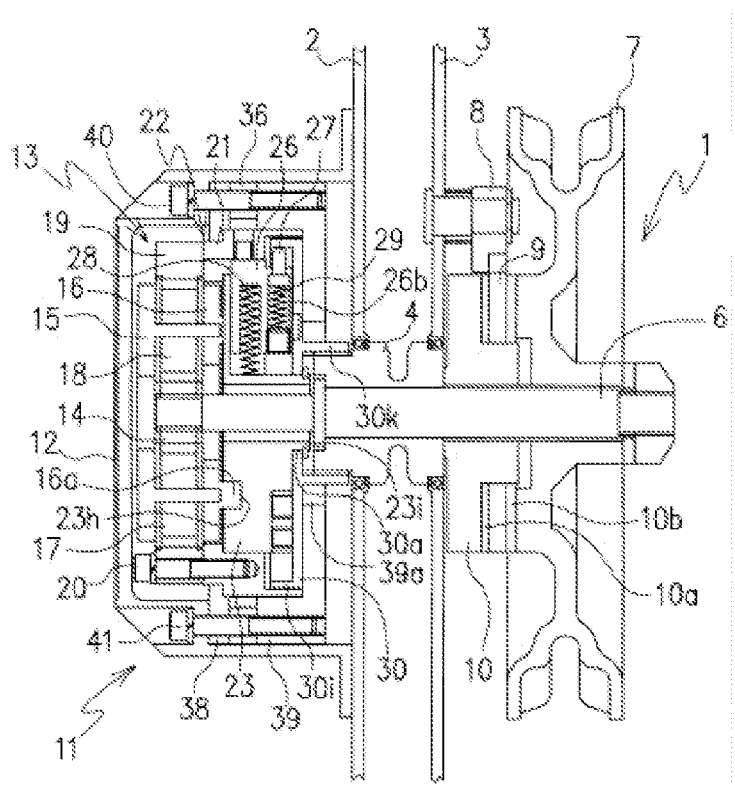
FIG. 1 is a sectional view showing a hoisting machine including a load sensing transmission according to Embodiment 1 of the present invention.
Figure 2:
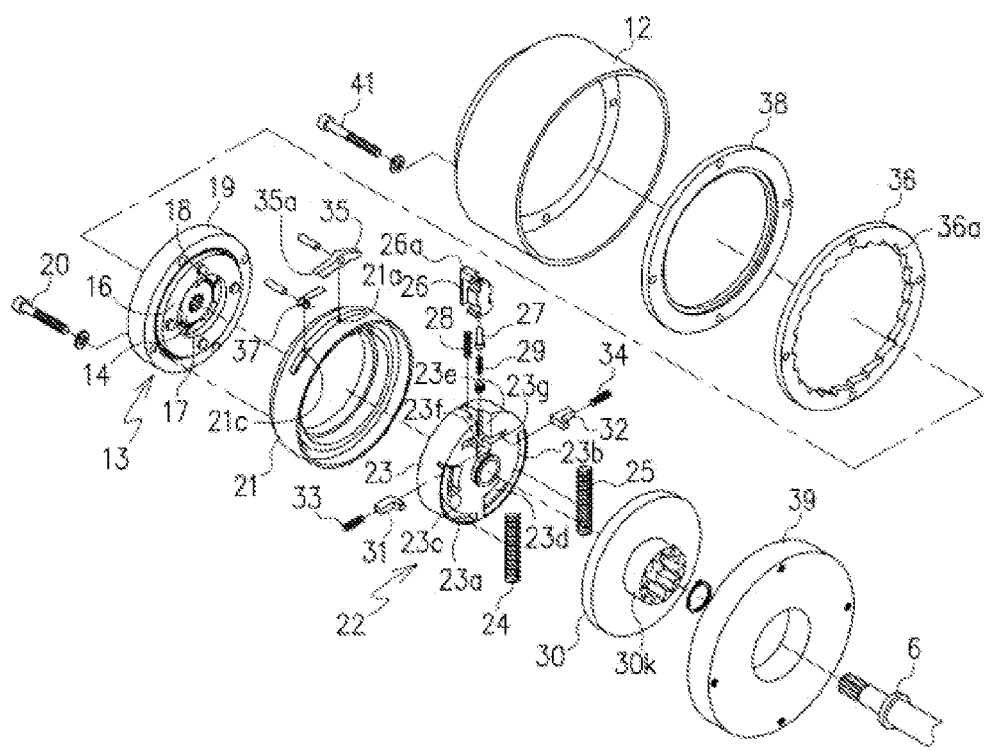
FIG. 2 is an exploded perspective view of the load sensing transmission shown in FIG. 1.
Figure 3:
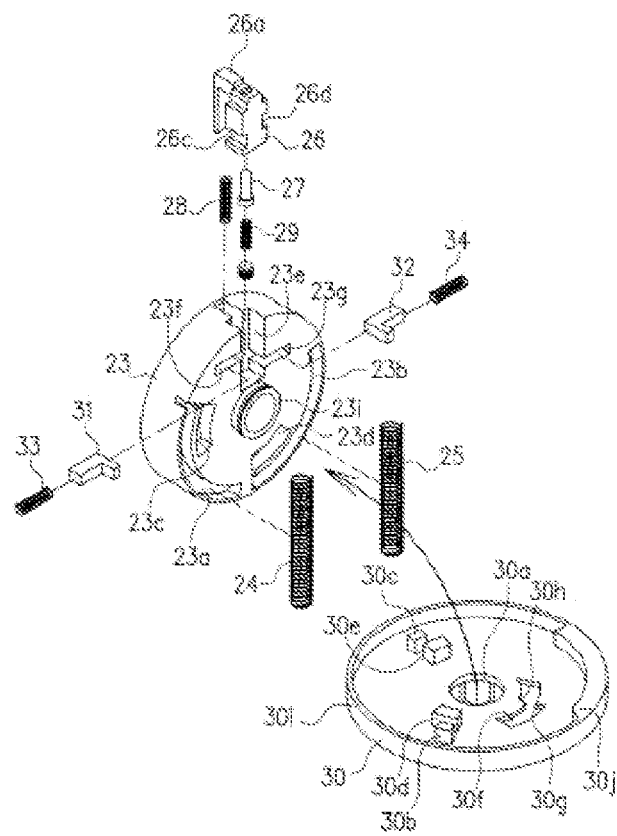
FIG. 3 is an exploded perspective view of a load sensing mechanism shown in FIG. 2.
Figure 4:
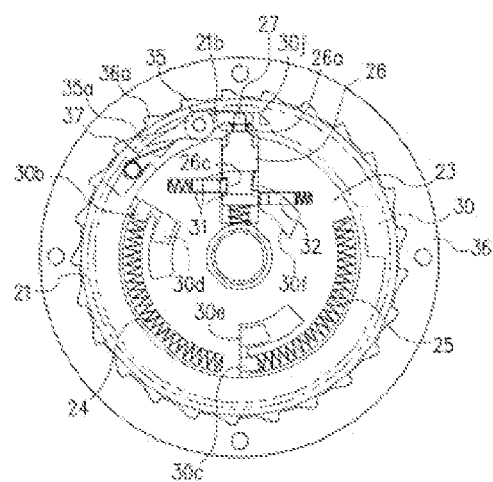
FIG. 4 is a front operational view showing a state as viewed from an axial direction, a plate with slider, a ring with engagement pawl, and a clutch ring and seeing therethrough a plate with cam as overlapped, as shown in FIGS. 1 to 3, in case of a state where a load is not applied and the rotation is at high speed.
Figure 5:
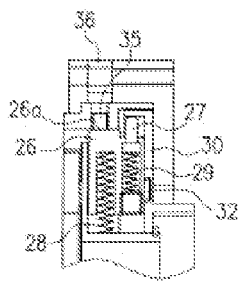
FIG. 5 is a sectional view of a main portion showing a section in vicinity of the slider in FIG. 4.

FIG. 1 is a sectional view showing a load sensing transmission according to a first embodiment of the present invention, FIG. 2 is an exploded perspective view of the load sensing transmission, FIG. 3 is an exploded perspective view of a load sensing mechanism of the load sensing transmission, and FIG. 4 is a front operational view showing a state as viewed a plate with slider, a ring with engagement pawl, and a clutch ring, from an axial direction and seeing therethrough a plate with cam as overlapped.

Reference number 1 illustrates a hoisting machine. The hoisting machine 1 includes frames 2 and 3 arranged to face at a predetermined interval, a load sheave 4 rotatably supported by the frames and configured to perform up and down movement of a load chain suspending a load which is not shown, a pinion shaft 6 which inserted in a central hole of the load sheave 4, and a hand wheel 7 threadably mounted on the pinion shaft 6 and rotated by a hand chain which is not shown. The hoisting machine 1 includes a mechanical breaking mechanism composed of a breaking receiver 10 having a boss portion and mounted to be impossible to rotate on the pinion shaft 6, a pair of breaking linings 10a, 10b mounted rotatably on the boss portion, and a ratchet gear 9 disposed between the breaking linings 10a, 10b and engaged with a ratchet pawl 8 attached to the frame 3 to prevent the ratchet gear from being rotated reversely.

Reference number 11 shows a load sensing transmission. All main elements of the load sensing transmission are contained in a gear cover 12 having a generally laterally-facing U-character shape in section. Reference number 13 shows a planetary gear train as a variable speed mechanism. The planetary gear train 13 includes a sun gear 14 positioned at a center thereof and mounted integrally on a leading end portion of the pinion shaft 6 as an input shaft that inputs rotation of the hoisting machine 1, a plurality of planetary gears 17, 18 each engaging with the sun gear 14 and each rotation shaft being mounted rotatably on a pair of planetary carriers 15, 16 to rotate about an axis of the planetary gears and orbit about the sun gear, and an internally-toothed ring gear 19 disposed at an outer periphery of the planetary gears 17, 18 and having internal tooth engaging with the planetary gears 17, 18. The sun gear 14 rotating integrally with the pinion shaft 6 constitutes a central rotating member, the planetary gears 17, 18 and the pair of planetary carriers 15, 16 constitutes inner rotation members, and the internally-toothed ring gear 19 constitutes an outer rotation member.

In planetary gear train 13, the sun gear 14 is rotated by the rotation input by the pinion shaft 6, thereby the planetary gears 17, 18 rotate and orbit about the sun gear. The rotation of the planetary carrier 16 at this time is the same as that of the pinion shaft 16 in direction and has a speed lower than that of the pinion shaft to be a low speed rotation. The low-speed rotation is output from the planetary carrier 16, if the internally-toothed ring gear 19 engages with the gear cover 12 side and is restricted to the rotation in one direction. On the other hand, if the internally-toothed ring gear 19 is rotated freely relative to the gear cover 12, and in addition the planetary gears 17, 18 does not rotate, the planetary carrier 16 is integral with the internally-toothed ring gear 19 and the sun gear and rotated at the same speed as them, thereby the rotation of the pinion shaft 6 is directly output from the planetary carrier 16 at a high-speed rotation. In this way, the internally-toothed ring gear 19 freely rotates, and simultaneously, the planetary carrier 16 is in an integral state with the internally-toothed ring gear 19 and the sun gear 14.

The internally-toothed ring gear 19 in the embodiment is connected to a ring 21 with engagement pawl by a bolt 20, and configured to rotate with a restriction of rotation or without the restriction of rotation, together with the ring 21 with engagement pawl. The ring 21 with engagement pawl 21 is provided with a hole 21a that attaches the engagement pawl, a hole 21c that attaches a pawl spring 37, and an inner concave portion 21b to be disposed adjacent to each other. Meanwhile, in the embodiment, the internally-toothed ring gear 19 and the ring 21 are formed separately and connected each other, but may be formed integrally with each other.

Reference number 22 shows a load sensing mechanism that is provided between the planetary gear train 13 and the load sheave 4 of the hoisting machine 1 and senses a load put on the load sheave 4 which is an output side. The load sensing mechanism 22 includes a plate 23 provided with a slider 26. The plate 23 with slider of the load sensing mechanism 22 comprises a disc in which the pinion shaft 6 is inserted loosely. The plate rotates integrally with the planetary carrier 16 by fitting a plurality of convex portions 16a provided on an outer surface of planetary carrier 16 in a plurality of concave portions 23h provided in a surface of the plate facing the planetary gear train 13. In addition, the plate 23 provided with the slider 26 in the embodiment is generally contained in the ring 21 with engagement pawl of the planetary gear train 13, and an outer peripheral surface of the plate 23 is disposed to face an inner peripheral surface of the ring 21 with engagement pawl, and the ring 21 with engagement pawl functions as a rotation bearing for the plate 23 with slider to prevent the plate from being moved in an axial direction. A surface of the plate 23 with slider, facing the hoisting machine 1 (hereinafter referred to as "output direction" or "output side") is provided with load-spring grooves 23a, 23b which are curved along a rotational direction of the plate 23, stopper grooves 23c, 23d similarly curved along the rotational direction, a slider groove 23e which extends in a radial direction of the plate and opens at an outer peripheral surface of the plate, and locking pin grooves 23f, 23g each communicating with the slider groove 23e from the rotational direction and being disposed at a deviated position in the radial direction.

A slider 26 having a substantially cuboid's shape is slidably inserted radially in the slider groove 23e of the plate 23 with slider. The slider 26 which is biased outwardly in the radial direction by a slider spring 28 positioned in an inner portion of the slider groove 23e to go in and go out of the slider groove 23e, and includes an engaging end 26 which has a convex shape and protrudes outwardly to face an inner concave portion 21b of the ring 21 with an engagement pawl, and a slider pin 27 disposed adjacent to the engaging end in the output direction. The engaging end 26a of the slider 26 and the inner concave portion 21b of the ring 21 constitute a connection switching mechanism which is a part of a switching mechanism. The slider pin 27 is contained in a pin attaching hole 26b provided radially in an inner portion of the slider 26, and is biased radially and outwardly by a pin spring 29 disposed in the pin attaching hole 26b. The slider pin 27 and the pin spring 29 constitute resilient members being in contact with a cam mechanism. In addition, locking pin-engaging portions 26c, 26d each having a laterally concave shape facing locking pin grooves 23f, 23g are provided in the side surfaces of the slider 26.

Load springs 24, 25 as load resilient members deforming against a load of the output side are contained in the load-spring grooves 23a, 23b.

Furthermore, locking pins 31, 32 each having a leading end portion having an L-character shape are slidably contained in the locking pin grooves 23f, 23g of the plate 23 with slider, respectively. The locking pins 31, 32 constitute a locking mechanism, and are biased toward the slider 26 by the locking pin sparing 33, 34 contained inside the locking pin grooves 23f, 23g. The locking pins 31, 32 engage with the locking pin-engaging portions 26c, 26d of the slider 26, thereby a holding mechanism to hold a radial portion of the slider 26 is provided.

On the other hand, the plate 30 with cam of the load sensing mechanism 22 comprises a disc having a shallow concave portion in section, and including a central hole 30a in which a boss 23i provided on a central portion of the output side of the plate 23 with slider is inserted. The plate 30 with cam is rotatably attached to the plate 23 with slider to be rotated with the same rotational axis as the plate 23 by attaching a C-ring for preventing the plate 30 from being removed from the plate 23 to a leading end portion of the boss 23i. Load spring pressing portions 30b, 30c each having a convex shape are provided on a surface of the plate 30 facing the plate 23 with slider and are configured to press in the rotational direction the load springs 24, 25 inserted in the load spring grooves 23a, 23b of the plate 23 with slider.

When a relative rotation is generated between the plate 30 with cam and the plate 23 with slider by a load of the output side and a rotation of the input side, the spring pressing portions 30b, 30c press the load springs 24, 25.

In addition, stoppers 30d, 30e each having a convex shape are provided on the surface of the plate 30 with cam facing the plate 23 with slider and configured to be inserted in the stopper grooves 23c, 23d of the plate 23 with slider. By the stopper 30d, 30e being inserted in the stopper grooves 23c, 23d, a relative rotation between the plate 23 with slider and the plate 30 with cam are restricted in a certain range. In addition, an unlocking groove 30f as an unlocking mechanism is provided in the surface of the plate 30 with cam, facing the plate 23 with slider and disposed to face the locking pins 31, 32, and configured to release the engagement of the locking pins 31, 32, without interrupting an operation of the locking pins 31, 32. Unlocking walls 30g, 30h configured to engage with the leading end portions of the locking pins 31, 32 and to unlock by the relative rotation between the plate 23 with solider and the plate 30 with cam are provided in the unlocking groove 30f.

Moreover, a cam portion 30j as a cam mechanism including a surface different in height is provided on an inner peripheral surface of an outer edge portion 30i of the plate 30 with cam. The cam portion 30j is configured to be contact with the slider pin 27 of the slider 26 to perform the entrance and the exit of the slider pin 27.

In FIG. 2, reference number 35 shows an engagement pawl attached to the ring 21 with engagement pawl, and reference number 36 shows a clutch ring. The engagement pawl 35 and the clutch ring 36 constitute a rotational restriction-switching mechanism which is a part of the switching mechanism. The engagement pawl 35 has a generally elongate plate-like shape, and includes a central portion which is rotatably inserted in the hole 21a of the ring 21 with engagement pawl. In addition, the engagement pawl 35 is biased by a pawl spring 37 attached to the ring 21 with the engagement pawl such that a pawl portion 35a provided at one end of the engagement pawl is constantly pressed out radially and outwardly. The other end of the engagement pawl 35 is at a position where the engagement end 26a of the slider 26 protrudes, and is driven as a seesaw by the engagement end 26a.

Figure 9:
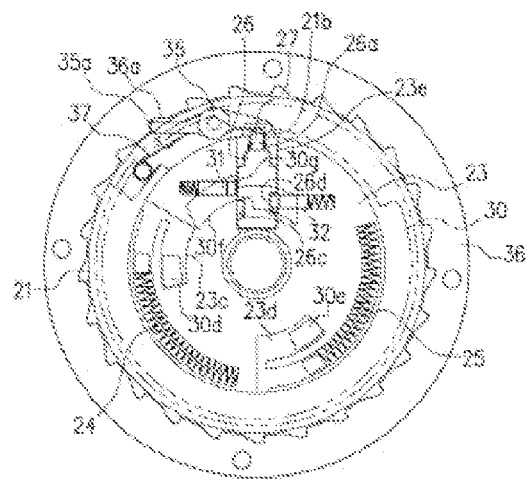
FIG. 9 is a front operational view showing the state as viewed from the axial direction, the plate with slider, the ring with engagement pawl, and the clutch ring and seeing therethrough the plate with cam as overlapped, as shown in FIGS. 1 to 3, in case of a state where a low speed switching load is applied and the rotation is switched to the low speed rotation.
Figure 11:
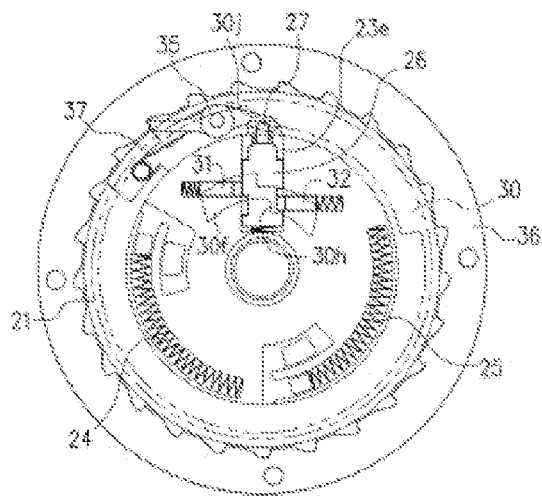
FIG. 11 is a front operational view showing the state as viewed from the axial direction, a plate with slider, a ring with engagement pawl, and a clutch ring and seeing therethrough the plate with cam as overlapped, as shown in FIGS. 1 to 3, in case of a state where a load is lighter than the low speed switching load and the low speed rotation is maintained.

On the other hand, the clutch ring 36 is disposed outside the ring 21 with engagement pawl and fixed to the gear cover 12, and includes clutch grooves 36a each having a generally mountain-like shape provided on an inner peripheral surface thereof and are configured to be engaged with the pawl portion 35a of the engagement pawl 35. The engagement of the pawl portion 35a of the engagement pawl 35 with one of the clutch grooves 36a of the clutch ring 36 makes it possible to restrict in one direction the rotation of the ring 21 (integral with the internally-toothed ring gear 19 of the planetary gear train 22) provided with the engagement pawl 35, and by releasing the engagement, the ring 21 is freely rotated. Meanwhile, in the embodiment, by the pawl portion 35a of the engagement pawl 35 being engaged with the clutch grooves 36a of the clutch ring 36, the rotation of the ring 21 with engagement pawl in a counterclockwise direction in FIGS. 9 and 11 is restricted, and thereby the ring 21 is not rotated in the counterclockwise direction, and with respect to the rotation of the ring 21 in the clockwise direction, the ring is in a state capable of rotating when adding a force of a certain strength or more. In the hoisting machine, the rotation of the ring 21 is preferably restricted in one direction in the counterclockwise direction.

This is because there is possibility that it is not possible to lift up and down if a state where the pawl portion 35a of the engagement pawl 35 remains engaged with the clutch grooves 36a of the clutch ring 36 is not released in a state where the slider 26 is entered the inner concave portion 21b of the ring 21 with engagement pawl for any reasons. Even in such a case, if the pawl portion 35a of the engagement pawl 35 is a state movable in the clockwise direction relative to the clutch groove 36a of the clutch ring 36, the ring 21 with engagement pawl can be rotated together with the plate 23 with slider and the plate 30 with cam. Consequently, even if the failure as mentioned above occurs, it is possible to move a suspended load in one direction. Meanwhile, the rotation of the plate 23 with slider in the counterclockwise direction is set to a direction when lowering the load, and the rotation of the plate 23 with slider in the clockwise direction is set to a direction when lifting up the load.

Reference number 38 shows an outer shaft ring, and reference number 39 shows an inner shaft ring. The outer shaft ring 38 and the inner shaft ring 39 are disposed to sandwich therebetween the clutch ring 36, fixed to the gear cover 12 by bolts 40, 41, and configured to form a rotation bearing pressing the load sensing mechanism 22 and so on from an axial direction.

Meanwhile, in the embodiment, a cylindrical connection portion 30k protruded from a central portion of the plate 30 with cam extends through a central hole 39a of the inner shaft ring 39 to the output side and is connected to an end portion of the load sheave 4 by means of a serration structure in such a manner that the plate 30 and the load sheave 4 cannot be relatively rotated.

Next, an operation of the hoisting machine including the load sensing transmission structured as mentioned, with reference to operational views as shown FIG. 1, and FIG. 4 to FIG. 12 is explained with a focus on an operation of the load sensing transmission.

In the hoisting machine 1 in the embodiment, if a load is not hung with the load chain, the load sheave 4 is rotated at a high speed in accordance with the rotation of the hand wheel 7, if a load heavy more than a predetermined low speed switching load is hung with the load chain, the load sheave 4 is rotated at a low speed. Furthermore, if a load is in a value lighter than a predetermined high speed switching load, the load sheave 4 is switched to a high speed rotation again. Such a switching from the low speed rotation and the high speed rotation of the load sheave 4 is performed depending on a load, in the load sensing transmission 11. That is to say, as shown in FIG. 1, the rotation of the hand wheel 7 is transmitted through the pinion shaft 6 to the sun gear 14 of the planetary gear train 13. When the planetary gears 17, 18 are rotated by the rotation of the sun gear 14, if the internally-toothed ring gear 19 disposed at the outer periphery of the planetary gears 17, 18 is fixed, the decelerated rotation is output from the planetary carrier 16 by the rotation and revolution of the planetary gears 17, 18. When the internally-toothed ring gear 19 is released and rotated integrally with the revolution of the planetary gears 17, 18, the rotation which is not decelerated is output as is from the planetary carrier 16 as a high speed rotation. The fixation and the release of the internally-toothed ring gear 19 are switched by sensing a load by the load sensing mechanism 22 and performing the engagement and disengagement by the engagement pawl 35. The rotation output from the planetary carrier 16 is transmitted through the plate 23 with slider, load springs 24, 25, and the plate 30 with cam to the load sheave 4, and thereby, the load sheave 4 is rotated at a low speed or a high speed.

Next, an operation of each of the sensing of the load by the load sensing mechanism 22 and the switching of the engaged state of the engagement pawl 35, depending on the load and the rotation speed is described. First, a case where a load is not completely applied to the load sheave 4, and the high speed is output is described with reference to FIGS. 1, 4 and 5. In this case, when the rotation from the hand wheel 7 is transmitted to the plate 23 with slider through the pinion shaft 6 and the planetary gear train 13, the plate 30 with cam connected to the load sheave 4 is immediately rotated when the rotation of the plate 23 with slider is transmitted to the plate 30 through the load springs 24, 25. Therefore, the load springs 24, 15 are maintained in the present state without being compressed, and the plate 30 with cam is not rotated relatively to the plate 23 with slider. At this time, the slider 26 maintains that state because the slider pin 27 is in a state facing the large diameter portion of the cam portion 30j and the relative rotation does not occur between the plate 23 with slider and the palate 30 with cam. The slider 26 at this time is in the state of protruding outwardly in the radial direction of the plate 23 by the slider spring 28, and the engaging end 26a of the slider presses the other end of the engagement pawl 35, and the pawl portion 35a of the engagement pawl 35 is disengaged from the clutch groove 36a of the clutch ring 36 against the pawl spring 37 and is in the disengaged state. Thereby, the ring 21 with engagement pawl to which the engagement pawl 35 is attached is in a released state from the fixed clutch ring 36. In addition, at this time, the engaging end 26a of the slider 26 is fitted in the inner concave portion 21b of the ring 21 with engagement pawl, and the plate 23 with slider and the ring 21 with engagement pawl are integrally rotated. Consequently, the internally-toothed ring gear 19 integrated with the ring 21 with engagement pawl is disengaged from the clutch ring 36 and is rotated together with the planetary gears 17, 18, the planetary carrier 16, and the sun gear 14 at the same speed as them. Consequently, the rotation of the pinion shaft 6 is directly transmitted to the plate 23 with slider and the plate 30 with cam, and this rotation is transmitted to the load sheave 4 as the high speed rotation, to rotate the load sheave 4 at the high speed.

In the slider 26 protruded outwardly in the radial direction, the locking pin 31 is engaged in the locking pin-engaging portion 26c. Thereby it is possible to hold stably the state of the slider 26. The locking of the slider 26 is effective to stabilize the rotation speed and the operation of the pinion shaft in an intermediate state when switching from the high speed to the low speed, or from the low speed to the high speed.

Figure 6:
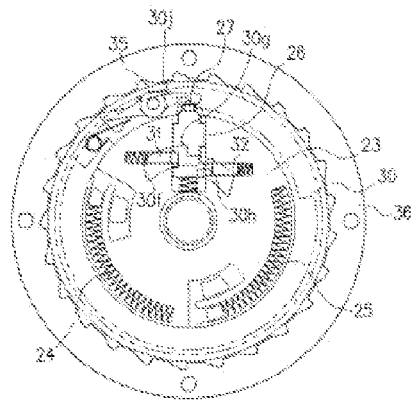
FIG. 6 is a front operational view showing the state as viewed from the axial direction the plate with slider, the ring with engagement pawl, and the clutch ring and seeing therethrough the plate with cam as overlapped, as shown in FIGS. 1 to 3, in case of a state where a light load is applied and the high speed rotation is maintained.
Figure 7:
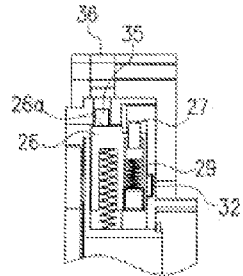
FIG. 7 is a sectional view of a main portion showing a section in vicinity of the slider in FIG. 6.

FIGS. 6 and 7 illustrate a state of the load sensing mechanism 22 and so on, in which a light load which is lower than the low speed switching load (which is set to about 5 kg in the embodiment) is applied to the load sheave 4, in the high speed rotation state as mentioned above. The illustrated state shows a case where a light load, for example, about 2 kg lower than the low speed switching load is applied to the load sheave 4. In this way, in the case where a load lighter than the low speed switching load is applied to the load sheave, when the rotation of the hand wheel 7 rotates the plate 23 with slider through the planetary gear train 13, the load springs 24, 25 provided between the plate 23 with slider and the plate 30 with cam are slightly compressed depending on a load to generate the relative rotation between the plate 23 with slider and the plate 30 with cam, because a load is applied to the plate 30 with cam through the load sheave 4. By the relative rotation, when the slider 26 is at a state facing the intermediate inclined portion of the cam portion 30j, the slider pin 27 is pressed in the slider 26, and the slider 26 remains protruded. In this state, the slider 26 presses the engagement pawl 35 in the radial direction to continue to disengage it from the clutch ring 36, similarly to the above. Consequently, the planetary gear train 13 does not perform the decelerating function, and the entirety of the planetary gear train is integrally rotated to output the high speed rotation.

In this way, even if the slight relative rotation occurs between the plate 23 with slider and the plate 30 with cam, the unlocking wall 30g of the unlocking mechanism 30f is not in contact with the locking pin 31, and the slider 26 is locked to be maintained in the state protruded in the radial direction (high speed switching position).

Figure 8:
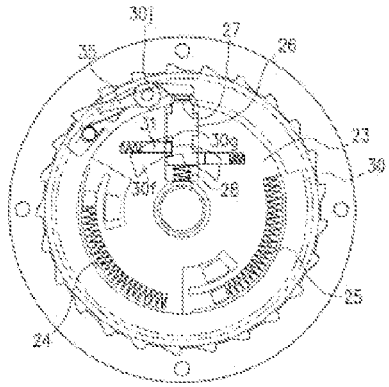
FIG. 8 is a front operational view showing the state as viewed from the axial direction, the plate with slider, the ring with engagement pawl, and the clutch ring and seeing therethrough the plate with cam as overlapped, as shown in FIGS. 1 to 3, in case of a state where a load larger than as in FIG. 6 is applied and the high speed rotation is maintained.

FIG. 8 illustrates a state of the load sensing mechanism 22 and so on, in which a load, for example, about 4 kg which is lower than the low speed switching load and larger than that of the state shown in FIG. 6 is applied, in the high speed rotation state. In this case, the load springs 24, 25 are further compressed from the state showing in FIG. 6 as mentioned above, and thereby a rotation angle of the relative rotation between the plate 23 with slider and the plate 30 with cam is increased. By this relative rotation, the slider 26 is at a state facing the small diametrical portion of the cam portion 30j, and the slider pin 27 is at a state pressed in the slider 26 maximally. At this time, the slider 26 is at a state biased inwardly in the radial direction by means of a pressure of the pin spring 29 compressed by the slider pin 27 pressed in the slider, against the slider spring 28. At this time, the locking mechanism 30f also rotates, and the unlocking wall 30g thereof approaches the leading end of the locking pin 31. However, in this state, the locking pin 31 does not yet move, the slider 26 is maintained to be locked in the protruded state (high speed switching position). Therefore, the engagement pawl 35 is maintained at the state pressed by the engaging end 26a of the slider 26. Consequently, at this time, the planetary gear train 13 does not perform the decelerating function, and the entirety thereof is integrally rotated to output the high speed rotation.

Figure 10:
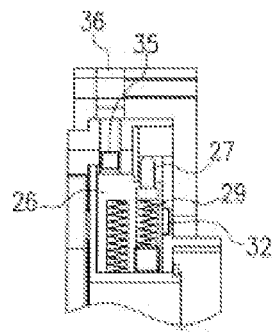
FIG. 10 is a sectional view of a main portion showing a section in vicinity of the slider in FIG. 9.

FIGS. 9 and 10 illustrate a state of the load sensing mechanism 22 and so on, in which a load, for example, about 5 kg or more which exceeds the low speed switching load is applied, in the high speed rotation state. In this case, the load springs 24, 25 are further compressed, if the load is still large, the stoppers 30d, 30e are in contact with the inner walls of the stopper grooves 23c, 23d. At this time, the unlocking wall 30g of the unlocking mechanism presses the leading end of the locking pin 31 and presses out and unlocks the locking pin 31 from the locking pin-engaging portion 26c of the slider 26. Thereby, the unlocked slider 26 is pressed in the inner portion (low speed switching position) of the slider groove 23e by the compressed pin spring 29 against the slider spring 28. Here, the engagement pawl is released from the slider 26 and the pawl portion 35a is pressed out outwardly in the radial direction by the pawl spring 37 to be engaged in the clutch groove 36a of the clutch ring 36. Thereby, the rotation of the ring 21 provided with the engagement pawl 35 in the counterclockwise direction toward the clutch ring 36 side is limited, and simultaneously can be rotated relatively to the plate 23 with slider by the engaging end 26a of the slider 26 being disengaged from the inner concave portion 21b by a force of the maximally compressed pin spring 29 against the slider spring 28. Consequently, the rotation of the internally-toothed ring gear 19 integrated with the ring 21 with engagement pawl in the counterclockwise direction is limited, and the planetary gears 17, 18 revolve while rotating. The revolution is output from the planetary carrier 16 as a decelerated low speed rotation. The low speed rotation is transmitted to the load sheave 4 through the plate 23 with slider and the plate 30 with cam, thereby it is possible to achieve the up and down movement of a load with the low speed.

In addition, as mentioned above, when the slider 26 is slid and pressed in the plate 23 radially and inwardly, then the locking pin 32 engages with the locking pin-engaging portion 26d of the slider 26 to lock the slider 26 in the pressed state in the plate (low speed switching position).

FIG. 11 illustrates a state of the load sensing mechanism 22 and so on, in which a load which is larger than the high speed switching load (which is set to, for example, about 1 kg in the embodiment) and lower than the low speed switching load is applied, in the low speed rotation state, as mentioned above. In this case, the load springs 24, 25 are restored by the reduced amount of load, and there is generated a relative rotation in an opposite direction to the aforementioned case between the plate 23 with slider and the plate 30 with cam. Thereby, the slider pin 27 is in contact with the inclined portion of the cam portion 30j again, and the slider pin 27 is in a generally protruded state from the slider 26. Although the slider 26 is adapted to be pressed out in the radial direction outwardly by the slider spring 28, at this time, the locking pin 32 engaging with the locking pin-engaging portion 26d of the slider 26 is not yet in contact with the unlocking wall 30h of the unlocking groove 30f and holds the slider 26 in the locked and retracted state (low speed switching position). Therefore, the engagement pawl 35 is not pressed by the slider 26, and is maintained in the state engaging with clutch ring 36 by the pawl spring 37. Consequently, the internally-toothed ring gear 19 integrated with the ring 21 with engagement pawl is maintained in the state where the rotation in the counterclockwise direction is limited, thereby the planetary gear train 13 holds the state outputting the low speed rotation.

Figure 12:
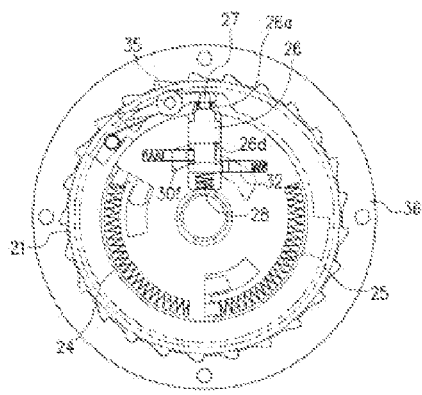
FIG. 12 is a front operational view showing the state as viewed from the axial direction the plate with slider, the ring with engagement pawl, and the clutch ring and seeing therethrough the plate with cam as overlapped, as shown in FIGS. 1 to 3, in case of a state where a load lower than the high switching load is applied and the rotation is switched to the high speed rotation.

FIG. 12 illustrates a state of the load sensing mechanism 22 and so on, in which a load which is further lighter than that of the case shown in FIG. 11 and is equal to or lower than the high speed switching load is applied. When the load is equal to or lower than the high speed switching load, the load springs 24, 25 are restored to the generally initiation state. Therefore, a large relative rotation is generated between the plate 23 with slider and the plate 30 with cam, and the unlocking wall 30h of the unlocking groove 30f presses the leading end of the locking pin 32 to allow the locking pin to disengage from the locking pin-engaging portion 26d of the slider 26. At this time, the slider 26 already reaches a position facing the large diametrical portion of the cam portion 30j, and the slider pin 27 also is protruded completely from the slider 26 to become the pin spring 29 in the restored state. Therefore, the slider is pressed out radially and outwardly (high speed switching position) by the slider spring 28. Thereby, the other end of the engagement pawl 35 is pressed by the engaging end 26a of the slider 26 against the pawl spring 37 and is moved as a seesaw. The pawl portion 35a at the leading end of the engagement pawl is out of the clutch groove 36a of the clutch ring 36 to be disengaged from the clutch ring. Simultaneously, the engaging end 26a of the slider 26 is fitted in the inner concave portion 21b of the ring 21 with engagement pawl. Consequently, the ring 21 with engagement pawl is released from the clutch ring 36, and the internally-toothed ring gear 19 is rotated together with the planetary gears 17, 18, the planetary carrier 16 and so on, and hence the planetary gear train 13 does not perform the decelerated function, and the entirety of the planetary gear train is integrally rotated to be switched to have the state outputting the high speed rotation. Meanwhile, if a position of the slider 26 disengaged from the locking pin 32 is not a position of the inner concave portion 21b, the slider continues to be rotated at the low speed at a while, when coming to the position facing the inner concave portion 21b, the state is switched from the low speed to the high speed. Moreover, in the illustrated embodiment, one inner concave portion 21b and one engagement pawl 35 are provided, but a plurality of inner concave portions and a plurality of engagement pawls which are the same numbers may be provided on a circumference of the ring 21 with engagement pawl. Thereby it is possible to accomplish rapid switching to the high speed and short loss time.

As mentioned above, in the load sensing transmission 11, until the predetermined low speed switching load and the predetermined high speed switching load are acquired, the slider 26 holds the state locked by the locking pins 31, 32. In this way, because the low speed switching load and the high speed switching load are predetermined, and the switching of the rotation speed is locked without the switching being performed in the predetermined load variation range, there is no neutral state in which the rotation direction is not established. Consequently, it is possible to prevent an unstable operation in which the switching to the high speed is suddenly performed despite the application of load, and the switching of the high speed and the low speed is repeated, and to stabilize and ensure the switching operation.

Meanwhile, in the embodiment, the slider pin biased by the pin spring 29 is used. However, even if a plate spring is used as a resilient member instead of the slider pin 27 and the pin spring 29, the similar advantageous effects can be acquired. In addition, in the embodiment, even if the load sensing mechanism 22 is disposed in a reversed state in an axial direction, that is to say, even if the plate 30 with cam is disposed to be driven to rotate by the planetary carrier 16 and the plate 23 with slider is disposed as a rotation output side, the similar advantageous effects to the above can be acquired.

Figure 13:
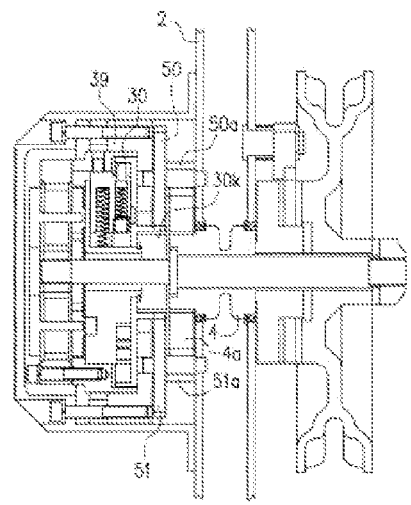
FIG. 13 is a sectional view showing a modified example of a part of the hoisting machine including the load sensing transmission of Embodiment 1.

FIG. 13 is a sectional view showing a modified example in which an additional deceleration mechanism other than the planetary gear train 13 is provided so that the load sensing transmission can be applied to a hoisting machine of a more large capacity. In the device shown in FIG. 1 mentioned above, the plate 30 with cam is directly connected to the load sheave 4. However, in the modified example, deceleration gears are provided between the plate 30 with cam and the load sheave 4. Gear teeth are provided on an outer circumference of the connection portion 30k of the plate 30 with cam, and deceleration gears 50, 51 are engaged with the teeth of the plate. Pinion gears 50a, 51a are coaxially and integrally provided on the deceleration gears 50, 51, respectively. The pinion gears 50a, 51a are engaged with a load gear 4a provided not to be rotated relatively on an end portion of the load sheave 4. In this way, by placing the connection portion 30k, the deceleration gears 50, 51, the pinion gears 50a, 51a, and the load gear 4a between the plate 30 with cam and the load sheave 4, the rotation of the plate 30 with cam is decelerated to increase a torque. Consequently, the load sensing transmission can be applied to a hoisting machine of a more large capacity, without changing the structure of the load sensing transmission 11.

Meanwhile, the deceleration gears 50, 51 have rotation shafts supported by the frame 2 of the hoisting machine 1 and the inner shaft ring 39, the deceleration gears 50, 51 can be added without adding a large change to the existing structure.

The load sensing transmission 11 in the aforementioned embodiments is applied to the hoisting machine 1, but is applicable to any devices in which it is required that a speed can automatically be changed depending on a load. For example, by attaching the load sensing transmission to an axle of a bicycle, it is possible to increase a rotational torque at a low speed rotation when a load increases on a sloping road and to switch the low speed rotation to a high speed rotation on an even road.

Figure 14:
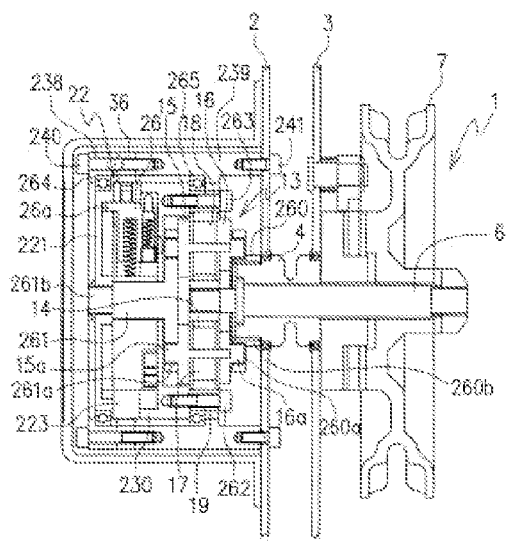
FIG. 14 is a sectional view showing a hoisting machine including a load sensing transmission according to Embodiment 2 of the present invention.
Figure 15:
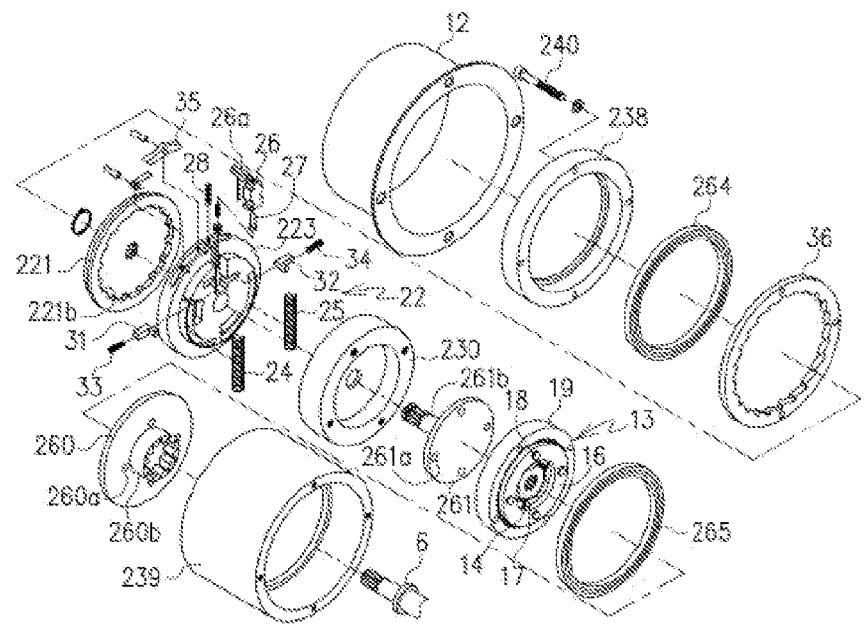
FIG. 15 is an exploded perspective view of the load sensing transmission shown in FIG. 14.
Figure 16:
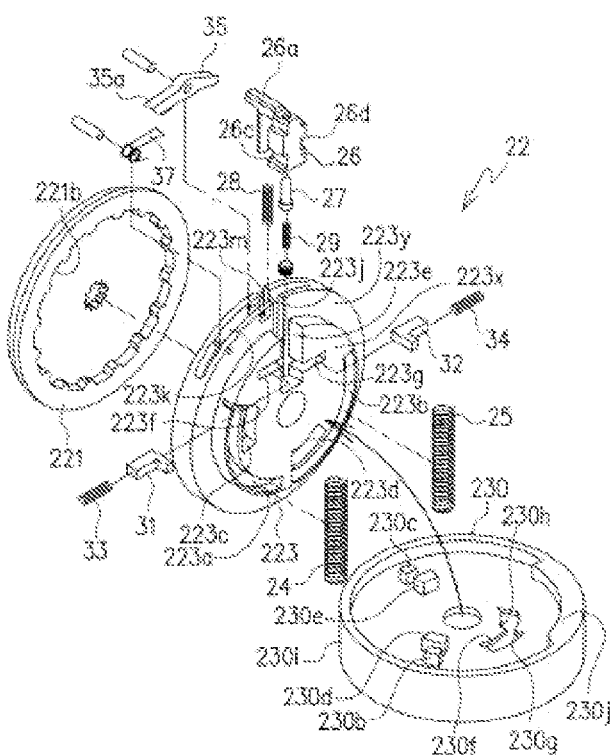
FIG. 16 is an exploded perspective view of a load sensing mechanism in FIG. 15.
Figure 17:
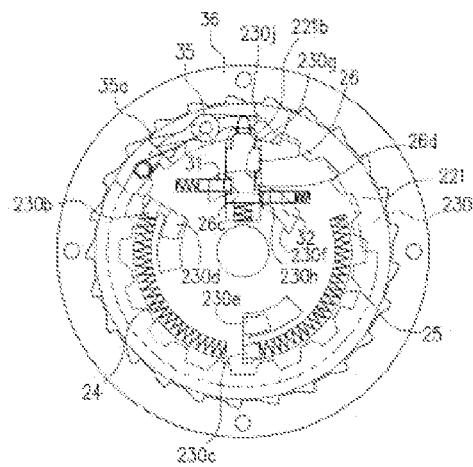
FIG. 17 is a front operational view showing a state as viewed from the axial direction, a plate with engagement pawl, a plate with engagement groove, and the clutch ring and seeing therethrough the plate with cam as overlapped, as shown in FIGS. 14 to 16, in case of a state where a load is not applied and the rotation is at high speed.

FIG. 14 is a sectional view showing a load sensing transmission according to Embodiment 2 of the present invention, FIG. 15 is an exploded perspective view of the load sensing transmission, FIG. 16 is an exploded perspective view of a load sensing mechanism, and FIG. 17 is a front operational view showing a state viewing a plate with engagement pawl, a plate with engagement groove, and a clutch ring, from an axial direction, and seeing a plate with cam overlapped on them through them.

In the load sensing transmission in Embodiment 1 as mentioned above, as shown in FIG. 1, in order from a right side of the drawing, a hoisting machine 1, a load sensing mechanism 22, and a planetary gear train 13 are arranged. Usually, there is no problem in this arrangement. However, if possible, it is desirable to prevent water, dust and so on from entering these parts to retain an operation of a slider 26 and so on smoothly throughout a long period. Therefore, this embodiment has a structure in which the load sensing mechanism 22 is disposed on the most inner side of the gear cover 12, and water, dust and so on entered the hoisting machine 1 from an exterior is difficult to be received. Meanwhile, in this embodiment, a variable speed mechanism, and a load sensing mechanism have basically structures similar to the planetary gear train 13 and the load sensing mechanism 22 in Embodiment 1, and a switching mechanism also has the similar structure. A part of connection and engagement parts mere differs from that of Embodiment 1. Therefore, in the following embodiments, the identical reference numbers are attached to parts having the same functions and the same operation as in Embodiment 1, and the description of the structures and the operations is simplified.

With respect to the hoisting machine 1 attached to the frames 2, 3, it has the same structure and operation as in Embodiment 1 as mentioned above.

The planetary gear train 13 in this embodiment has a structure in which the sun gear 14 is attached to the pinion shaft 6, and a rotation is output from the planetary carrier 16 as the inner rotation member facing the output side. A load outputting joint 260 transmitting the rotation from the planetary carrier 16 includes a plate and a plurality of holes 260a provided in the plate. Convex portions 16a are provided on the planetary carrier 16 and are fitted in the holes 260a of the load outputting joint 260 so that the load outputting joint 260 is integrally rotated with the planetary carrier 16. The load outputting joint 260 includes a cylindrical connection portion 260b which is connected to an end portion of the load sheave 4 through a serration structure.

A joint 261 is fitted to the planetary carrier 15 opposite to the planetary carrier 16 in the planetary gear train 13. The joint 261 has a disc-like shape, includes a plurality of holes 261a provided in a plate surface, and is integrally rotated with the planetary carrier 15 by fitting protrusions provided on the planetary carrier 15 in the holes 261a. In addition, a shaft portion 261b is provided on a central portion of the joint 261.

A plate 221 with engagement groove constituting a part of the switching mechanism is attached to a leading end of the shaft portion 261b of the joint 261 to be rotated integrally with the joint. The plate 221 with engagement groove includes a plurality of inner circumferential concave portions 221b which are provided in a ring-shaped thickened inner circumferential portion disposed close to an outer circumference of a surface facing the load sensing mechanism 22 and are configured to engage with the slider 26.

The load sensing mechanism 22 in this embodiment is provided between the variable speed mechanism 13 and the plate 221 with engagement groove. The load sensing mechanism 22 includes a plate 223 with engagement pawl and a plate 230 with cam, as a pair of plate members, which has a disc-like shape and is rotatably supported by the shaft portion 261b of the joint 261.

The plate 223 with engagement pawl in the embodiment includes a small diametrical portion 223x provided at the plate 230 side and a large diametrical portion 223y provided at the plate 221 side. A surface of the small diametrical portion 223x of the plate 223 with engagement pawl facing the plate 230 with cam is provided with load spring grooves 223a, 223b which are curved in a rotational direction similarly to the plate 23 with slider in Embodiment 1, stopper grooves 223c, 223d which are curved in a rotational direction, a slider groove 223e provided to extend in a radial direction and opened at an outer circumferential surface, and locking pin grooves 223f, 223g which are communicated with the slider groove 223e from the rotational direction and are disposed at a position deviated each other in the radial direction.

The slider 26 having a generally cuboid-like shape similar to that in Embodiment 1 is radially and slidably contained in the slider groove 223e of the plate 223 with engagement pawl. The slider 26 also is biased outwardly in the radial direction by the slider spring 28 contained in an inner portion of the slider groove 223e and moved in and out of the slider groove, and includes an engaging end 26a engaging in the inner concave portion 221b of the plate 221 with engagement groove, and a slider pin 27 arranged adjacent to the engaging end. In this embodiment, the engaging end 26a of the slider 26 and the inner concave portion 221b of the plate 221 with engagement groove constitute a connection switching mechanism which is a part of the switching mechanism. In addition, similarly to Embodiment 1, the slider pin 27 is contained in the pin attaching hole 26b provided in an inner portion of the slider to extend in the radial direction and biased radially and outwardly by the pin spring 29 contained in the pin attaching hole 26b. The side surface of the slider 26 is provided with the locking pin-engaging portions 26c, 26d arranged to face locking pin grooves 223f, 223g and formed to have a laterally arranged concave shape. Meanwhile, the engaging end 26a of the slider 26 in the embodiment is configured to further extend in the axial direction, compared with the Embodiment 1 from a relationship of a distance between the engaging end 26a and the inner concave portion. However, a function and an operation are the same.

Moreover, the load springs 24, 25 as load resilient members to deform against a load, similarly to Embodiment 1 are contained in load spring grooves 223a, 223b of the plate 223 with engaging pawl.

Furthermore, locking pins 31, 32 each having an L shape at a leading end, similarly to Embodiment 1 are slidably contained in locking pin grooves 223f, 223g of the plate 223 with engaging pawl. The locking pins 31, 32 also are biased by the locking pin springs 33. 34 contained in the inner portion of the locking pin grooves 223f, 223g to a direction of the slider 26. A holding mechanism to hold a radial position of the slider 26 is formed by engaging the locking pins 31, 32 with the locking pin engaging portions 26c, 26d of the slider 26, respectively.

The large diametrical portion 223y of the plate 223 with engagement pawl is provided with a radially extending slit portion 223j provided at a position same as that of the slider groove 223e, and an elongate engaging pawl groove 223k extending along an outer circumferential surface to intersect with the slit portion 223j.

On the other hand, the plate 230 with cam in this embodiment includes both surfaces each having a concave portion and is formed by a disc having a generally I-character shape in section. The small diametrical portion 223x of the plate 223 with engagement pawl is fitted in the concave portion of the plate 230 with cam. The plate 230 with cam is attached to the internally-toothed ring gear 19 of the planetary gear train 13 by bolts 262, 263. A surface of the plate 230 with cam facing the plate 223 with engagement pawl is provided with convex shaped load spring pressing portions 230b, 230c configured to fit in the load spring grooves 223a, 223b and press the load springs 24, 25 in the rotational direction. When a relative rotation is generated between the plate 230 with cam and the plate 223 with engagement pawl by a load, the load spring pressing portion 230b, 230c are configured to press the load springs 24, 25.

The surface of the plate 230 with cam facing the plate 223 with engagement pawl is also provided with convex shaped stoppers 230d, 230e fitted in stopper grooves 223c, 223d, similarly to Embodiment 1. The relative rotation between the plate 223 with engagement pawl and the plate 230 with cam is restricted in a certain range by fitting the stoppers 230d, 230e in the stopper grooves 223c, 223d. In addition, the surface of the plate 230 with cam facing the plate 223 with engagement pawl is further provided with an unlocking groove 230f which is disposed to face the locking pins 31, 32, and disengages the locking pins without interrupting an operation of the locking pins. The unlocking groove 230f is provided with unlocking walls 230g, 230h engaging with the leading ends of the locking pins 31, 32, respectively by the relative rotation between the plate 223 with engagement pawl and the plate 230 with cam and releasing the lock of the locking pins.

Moreover, an inner circumferential surface of an outer edge portion 230i of the plate 230 with cam is provided with a cam portion 230j as a cam mechanism formed by a surface having a height difference. The cam surface 230j is in contact with the slider pin 27 of the slider 26, whereby performing the movement of the slider pin 27 in and out of the slider 26 and the movement of the slider 26.

An engagement pawl 35 is provided on the plate 223 with engagement pawl in the embodiment, and constitutes a rotational restriction-switching mechanism which is a part of the switching mechanism, by engaging with the clutch ring 36. Similarly to Embodiment 1, the engagement pawl 35 has an elongate plate-like shape, and is pivotally fitted at a central portion in a hole 223m of the plate 223 with engagement pawl. In the engagement pawl 35, the pawl portion 35a at one end is biased to be pressed out radially and outwardly by the pawl spring 37 attached to the plate 223 with engagement pawl. The other end of the engagement pawl 35 is in a position where the engaging end 26a of the slider 26 protrudes, and the engagement pawl is moved as a seesaw by the engaging end 26a. On the other hand, the clutch ring 36 is disposed outside the plate 223 with engagement pawl and sandwiched between the outer shaft rings 238, 239, and fixed to the frame 2 by bolts 240, 241. The clutch ring 36 includes the clutch grooves 36a each having a generally mountain-like shape and provided in an inner circumferential surface of the clutch ring 36 and configured to conform to the pawl portion 35a of the engagement pawl 35. The rotation of the plate 223 (integral with the internally-toothed ring gear 19 of the planetary gear train through the plate 230 with cam) to which the engagement pawl 35 is attached is restricted in one direction, by engaging the pawl portion 35a of the engagement pawl 35 with the clutch groove 36a of the clutch ring 36, and by releasing the engagement, the plate 223 with engagement pawl can be rotated freely.

Meanwhile, even in the embodiment, similarly to Embodiment 1, the rotation of the plate 223 with engagement pawl in the counterclockwise direction in FIG. 17 is restricted and fixed not to rotate in the counterclockwise direction by engaging the pawl portion 35a of the engagement pawl 35 with the clutch groove 36a of the clutch ring 36. With respect to the rotation of the plate 223 with engagement pawl in the clockwise direction, the plate 223 is configured to be capable of being rotated when a force exceeding a value is applied.

In addition, in the embodiment, bearings 264, 265 are provided between the outer shaft ring 238 and the plate 221 with engagement groove, and between the outer shaft ring 239 and the planetary gear train 13, respectively.

Next, an operation of the hoisting machine including the load sensing transmission structured as mentioned above is described. In the embodiment, similarly to Embodiment 1, if the internally-toothed ring gear 19 disposed at the outer circumference is fixed, the decelerated rotation is output from the planetary carrier 16, and if the internally-toothed ring gear 19 is released and in addition rotated integrally together with the revolution of the planetary gears 17, 18, the rotation not being decelerated is output directly as is from the planetary carrier 16 as a high speed rotation. The fixation and the release of the internally-toothed ring gear 19 are switched by sensing a load by the load sensing mechanism 22 and performing the engagement and the disengagement by the engagement pawl 35. The rotation output from the planetary carrier 16 is transmitted to the load sheave 4 through the load outputting joint 260 so that the load sheave 4 is rotated at a low speed or a high speed.

If no load or a light load is applied to the load sheave 4, the plate 230 with cam is at the initial position relative to the plate 223 with engagement pawl by the elasticity or restoration of the load springs 24, 25, at this time, the slider 26 is in the state facing the large diametrical portion of the cam portion 230j.

The slider 26 at this time is at the state protruded radially and outwardly by the slider spring 28, and the engaging end 26a presses the other end of the engagement pawl 35. Consequently, the pawl portion 35a of the engagement pawl 35 is in the disengaged state released from the clutch groove 36a of the clutch ring 36 against the pawl spring 37. Thereby, the plate 223 provided with the engagement pawl 35 is at the state released from the clutch ring 36 being fixed.

In addition, at this time, the engaging end 26a of the slider 26 is fitted in the inner concave portion 221b of the plate 221 with engagement groove, and the plate 223 with engagement pawl and the plate 221 with engagement groove are integrally rotated. Thereby, the plate 223 with engagement pawl is connected to the planetary carrier 15 of the planetary gear train 13 through the joint 261 and the plate 221 with engagement groove. On the other hand, because the plate 230 with cam is combined to the internally-toothed ring gear 19 of the planetary gear train 13, the planetary carrier 15 and the internally-toothed ring gear 19 are integrally connected through the load sensing mechanism 22 and transmit as is the rotation of the pinion shaft 6 and output it to the load sheave 4 as a high speed rotation.

Meanwhile, similarly to Embodiment 1, in the slider 26 protruded radially and outwardly, the locking pin 31 is at the state engaged in the locking pin-engaging portion 26c.

In this state, when a load is applied to the load sheave 4, the planetary carriers 15, 16 and the internally-toothed ring gear 19 of the planetary gear train 13 are relatively rotated, and the rotation is transmitted to the plate 223 with engagement pawl and the plate 230 with cam. By the relative rotation of the planetary carriers 15, 16 and the internally-toothed ring gear 19 at this time, the relative rotation is generated between the plate 223 with engagement pawl and the plate 230 with cam, and the load springs 24, 25 provided therebetween are compressed.

If a load is light, the relative rotation between the plate 223 with engagement pawl and the plate 230 with cam is slight, and the slider 26 faces the intermediate inclined portion of the cam portion 230j, the slider pin 27 is merely pressed in the slider 26, and the slider 26 is maintained to remain protruded. Therefore, the state to output a high speed rotation is maintained.

In this way, the unlocking wall 230g of the unlocking groove 230f is not in contact with the locking pin 31, the slider 26 is locked to maintain the state where the slider 26 is protruded radially (high speed switching position).

When a further large load is applied, the load springs 24, 25 are compressed further from the aforementioned state; thereby the relative rotation between the plate 223 with engagement pawl and the plate 230 with cam is increased in rotation angle.

If a load exceeding the low switching load is applied, the load springs 24, 25 are further compressed, and the unlocking wall 230g of the unlocking mechanism 230f presses the leading end of the locking pin 31 and presses out it of the locking pin-engaging portion 26c of the slider 26 to unlock it. Thereby, unlocked slider 26 is pressed in the inner side of the slider groove 223e (low switching position) by a force of the compressed pin spring 29 against the slider spring 28. Here, the engagement pawl 35 is released from the slider 26, the pawl portion 35a is pressed out radially and outwardly by the pawl spring 37 and engages with the clutch groove 36a of the clutch ring 36. Thereby, the rotation of the plate 223 provided with the engagement pawl 35 in the counterclockwise direction is restricted by the clutch ring 36, and simultaneously can be relatively rotated to the plate 221 with engagement groove by the engaging end 26a of the slider 26 being released from the inner concave portion 221b.

In this state, the rotation of the plate 230 with cam is restricted by the plate 223 with engagement pawl, thereby the rotation of the internally-toothed ring gear 19 attached to the plate 230 with cam also is restricted. Consequently, the planetary gears 17, 18 rotates and orbits, and the revolution is output from the planetary carrier 16 as a decelerated low speed rotation.

In addition, at this time, similarly to Embodiment 1, the locking pin 32 engages with the locking pin-engaging portion 26d of the slider 26 and locks the slider 26 in the pressed state therein (low speed switching position).

In the state of the low speed rotation, as mentioned above, when a load becomes light, the load springs 24, 25 are restored by a lightened amount, and the opposite relative rotation is generated between the plate 223 with engagement pawl and the plate 230 with cam. Thereby, the slider pin 27 is in contact with the inclined portion of the cam portion 230j again, and even if the slider pin 27 is in the state protruded from the slider 26, the locking pin 32 locks the slider 26 and maintains it in the retracted state (low speed switching position). Therefore, the planetary gear train 13 is held to the state outputting the low speed rotation.

When a load is further light and is equal to or lighter than the high speed switching load, the load springs 24, 25 are restored to the generally initial state. Therefore, the relative rotation between the plate 223 with engagement pawl and the plate 230 with cam also becomes large, the unlocking wall 230h of the unlocking groove 230f presses the leading end of the locking pin 32 and disengages the locking pin from the locking pin-engaging portion 26d of the slider 26. At this time, the slider 26 reaches a position facing the large diametrical portion of the cam portion 230j and pressed out radially and outwardly (high speed switching position) by the slider spring 28. Thereby, the engagement pawl 35 is pressed at the other end thereof by the engaging end 26a of the slider 26, and the pawl portion 35a disposed at the leading end is out of the clutch groove 36a of the clutch ring 36 and unlocked. Simultaneously, the engaging end 26a of the slider 26 is fitted in the inner concave portion 221b of the plate 221 with engagement groove. Consequently, the plate 223 with engagement pawl is release from the clutch ring 36 and is connected to planetary carrier 15. The internally-toothed ring gear 19 is rotated together with the planetary gears 17, 18 and the planetary carrier 16 and so on. Thereby, the planetary gear train 13 does not perform decelerating function, and the entirety thereof is integral and switched in the state where the high speed rotation is output.

At this time, because the plurality of inner concave portions are provided on the circumference of the plate 221 with engagement groove, when the slider 26 is disengaged from the locking pin 32, immediately is fitted in inner concave 221b, thereby it is possible to switch rapidly from the low speed state to the high speed state.

As mentioned above, in the embodiment, the load sensing mechanism 22 is disposed at the inner side of the gear cover 12. However, it is possible to provide a transmission in which the same operational effect can be acquired without changing almost configurations of the parts.

Figure 18:
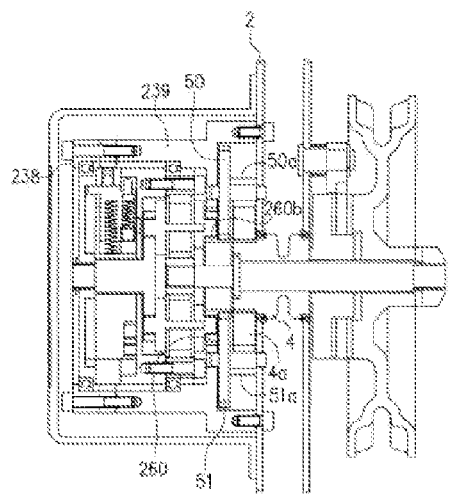
FIG. 18 is a sectional view showing a modified example of a part of the hoisting machine including the load sensing transmission shown in FIG. 14.

FIG. 18 is a sectional view showing a modified example in which an additional deceleration mechanism other than the planetary gear train 13 is provided, similarly to Embodiment 1. In the modified example, decelerating gears are provided between the load outputting joint 260 and the load sheave 4. The connection portion 260b of the load outputting joint 260 is formed at an outer circumference thereof with teeth with which decelerating gears 50, 51 are engaged. The decelerating gears 50, 51 are integrally and coaxially provided with pinion gears 50a, 51a. The pinion gears 50a, 51a are engaged with a load gear 4a provided on an end portion of the load sheave 4 not to be relatively rotated. In this way, by disposing the connection portion 260b, the decelerating gears 50, 51, the pinion gears 50a, 51a, and the load gear 4a between the load outputting joint 260 and the load sheave 4, it is possible to increase a torque by decelerating the rotation of the load outputting joint 260 and apply to a hoisting machine having a larger capacity without changing the structure of the load sensing transmission 11. Meanwhile, a rotational shaft of each of the decelerating gears 50, 51 is supported by the frame 2 and the outer shaft ring 239.

Figure 19:
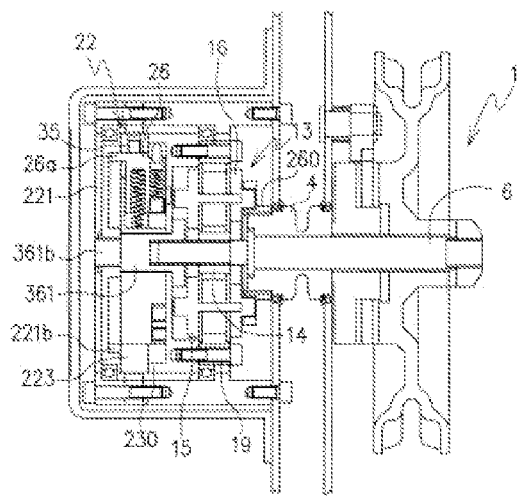
FIG. 19 is a sectional view showing a hoisting machine including a load sensing transmission according Embodiment 3 of the present invention.

FIG. 19 is a sectional view showing a load sensing transmission according to Embodiment 3 of the present invention. This embodiment has a structure similar to Embodiment 2 mentioned above, in which a part of the connection of the planetary gear train 13 and the load sensing mechanism 22 and so on is changed. That is to say, in the embodiment, a leading end of the pinion shaft 6 is extended and protruded at a left side of the sun gear 14 in the drawing, and a joint 361 is attached integrally to its leading end portion to be rotated together. The plate 221 with engagement groove is attached to the end portion of the joint 361. Thereby, in Embodiment 2, although the planetary carrier 15 of the planetary gear train 13 is connected to the plate 221 with engagement groove through the joint 261, in this embodiment, the pinion shaft 6 rotating integrally with the sun gear 14 of the planetary gear train 13 is connected to plate 221 with engagement groove through the joint 361.

In Embodiment 3 in which the modification as mentioned above is added, if no load or light load is applied and the rotation at a high speed is made, the slider of the load sensing mechanism 22 is in the state protruded outwardly, thereby the plate 223 with engagement pawl and the plate 221 with engagement groove are connected to through the slider 26. At this time, the engagement pawl 35 is separated from the clutch ring 36 and disengaged. Therefore, through the joint 361, the plate 221 with engagement groove, the slider 26, the plate 223 with engagement pawl, and the plate 230 with cam, the sun gear 14 and the internally-toothed ring gear 19 are connected and rotated together integrally, and the rotation is output from the planetary carrier 16 and the load outputting joint 260 as the high speed rotation.

When a load is applied to the load sheave 4, the planetary carrier 16 and the internally-toothed ring gear 19 of the planetary gear train 13 are rotated. At this time, the rotation of the pinion shaft 6 stopped by the hoisting machine 1, and the relative rotation is generated between the sun gear 14 and the internally-toothed ring gear 19. By this relative rotation, the relative rotation is generated between the plate 223 with engagement pawl and the plate 230 with cam connected to the sun gear 14 and the internally toothed ring gear 19, respectively, and the load springs 24, 25 provided therebetween are compressed. Then, when a load becomes the low speed switching load, the slider 26 is in the inwardly retracted state as mentioned above, the engagement of the plate 223 with engagement pawl and the plate 221 with engagement groove is released, and the rotation of the plate 223 with engagement pawl is restricted by engaging the engagement pawl 35 with the clutch ring 36. When the rotation of the plate 223 with engagement pawl is restricted, the rotation of the plate 230 with cam and the internally-toothed ring gear 19 is restricted, the rotation which is the same rotational direction as that of the sun gear 14 and is the low speed rotation is output from the planetary carrier 16 by the decelerating operation of the planetary gear train 13.

Meanwhile, similarly to Embodiments 1 and 2 mentioned above, until a load becomes the low speed switching load and the high speed switching load which are set, the slider 26 is locked by the locking pins 31, 32 and holds the state, it can be prevented to become suddenly high speed state although a load is applied, and unstable operation such as the repetition of switching of the high speed and the low speed, and hence it is possible to accomplish stable and secure switching operation.

In addition, even in this embodiment, it is possible to apply the transmission to a hoisting machine having a large capacity by providing the decelerating gears 50, 51 in Embodiment 2 similarly.

Figure 20:
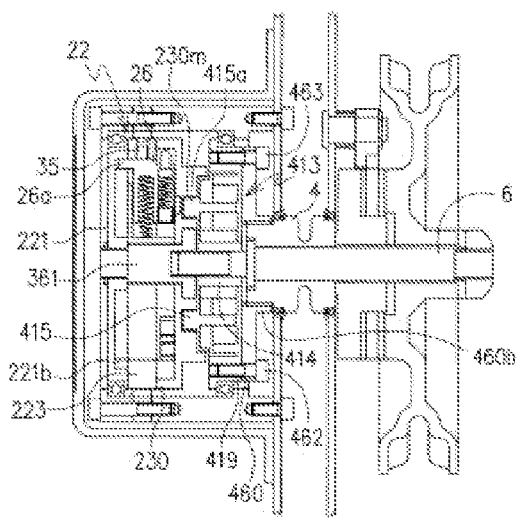
FIG. 20 is a sectional view showing a hoisting machine including a load sensing transmission according Embodiment 4 of the present invention.
Figure 21:
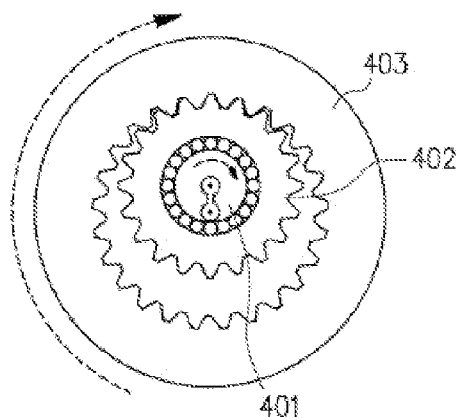
FIG. 21 is a sectional view as viewed from an axial direction showing one example of an inner structure of a variable speed mechanism in FIG. 20.
Figure 22:
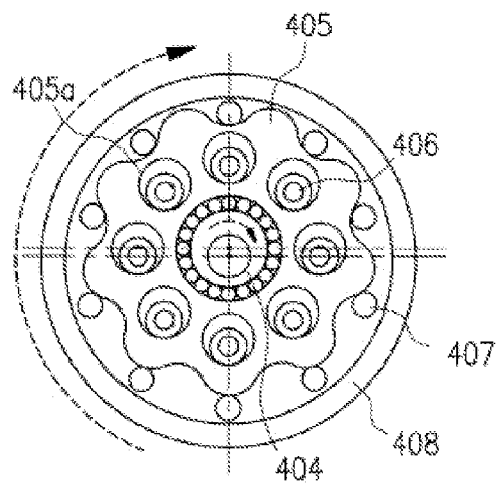
FIG. 22 is a sectional view as viewed from an axial direction showing another example of an inner structure of a variable speed mechanism in FIG. 20.

FIG. 20 is a sectional view showing a load sensing transmission according to Embodiment 4 of the present invention. A variable speed mechanism in this embodiment uses a gear mechanism 413 formed by an internal contact-type planetary gear train or cycloidal gear train which is capable of setting a deceleration ratio larger than that of the foregoing planetary gear train. As shown in FIG. 21, the internal contact-type planetary gear train includes a central eccentric crank 401, a planetary gear 402 with which the crank 401 is in internally contact, and a sun inner gear 403 engaging with the planetary gear 402. The cycloidal gear train includes a central eccentric body 404, a curved line plate 405 with which the eccentric body 404 is in internally contact, inner pins 406 fitted to be internally contacted in a plurality of holes 405a which are provided in the curved line plate 405 to be arranged circularly, outer pins 407 configured to be contacted with a wave-type outer circumference of the curved line plate 405, and an outer ring 408 supporting the outer pins 407, as shown in FIG. 22. The gear mechanism 413 formed by the internal contact-type planetary gear train or cycloidal gear train having the foregoing inner structure includes a central high speed crank 414 as a central rotational member having the crank 401 or the eccentric body 404, an inner low speed carrier 415 as an inner rotational member driven by the planetary gear 402 or the inner pins 406, and an outer low speed ring 419 as an outer rotational member driven by the sun inner gear 403 or the outer pins 407.

In the embodiment, the leading end of the pinion shaft 6 is extended to protrude to a left side of the central high speed crank 414 of the gear mechanism 413, in the drawing, and a joint 361 similar to Embodiment 3 is attached to the leading end of the pinion shaft to be rotated integrally. The plate 221 with engagement groove is attached to an end portion of the joint 361. Thereby, in the embodiment, the pinion shaft 6 rotating integrally with the central high speed crank 414 of the gear mechanism 413 is connected to the plate 221 with engagement groove through the joint 361. In addition, the inner low speed carrier 415 of the gear mechanism 413 is connected to the plate 230 with cam by fitting a convex portion 415a of the inner low speed carrier 415 in a concave portion 230m of the plate 230 with cam, facing the convex portion. Furthermore, the outer low speed ring 419 is attached to the load outputting joint 460 by bolts 462, 463, and the connection portion 460b disposed at the central portion of the load outputting joint 460 is attached to the load sheave 4 to be integrally rotated together.

In Embodiment 4 in which the modification as mentioned above is added. If there is no load, or a light load is applied and the rotation at a high speed is achieved, the slider 26 of the load sensing mechanism 22 is in the state protruded outwardly as mentioned above, and thereby the plate 223 with engagement pawl and the plate 221 with engagement groove are connected through the slider 26. At this time, the engagement pawl 35 is separated from the clutch ring 36 and disengaged. Therefore, the pinion shaft 6 (central high speed crank 414) and the inner low speed carrier 15 are connected through the joint 361, the plate 221 with engagement groove, the slider 26, the plate 223 with engagement pawl, and the plate 230 with cam, and rotated integrally with the outer low speed ring 419, and the rotation is output from the outer low speed ring 419 through the load outputting joint 460, as the high speed rotation.

In addition, when a load is applied to the load sheave 4, the outer low speed ring 419 and the inner low speed carrier 415 of the gear mechanism 413 are rotated. At this time, the rotation of the pinion shaft 6 (central high speed crank 414) is stopped by the hoisting machine 1, and the relative rotation is generated between the central high speed crank 414 and the inner low speed carrier 415. By this relative rotation, the relative rotation is generated between the plate 223 with engagement pawl and the plate 230 with cam connected to the central high speed crank 414 and the inner low speed carrier 415, respectively, the load springs 24, 25 provided therebetween are compressed. Then, when the load becomes the low speed switching load, the slider 26 is in the inwardly retracted state, as mentioned above, the plate 223 with engagement pawl and the plate 221 with engagement groove are disengaged, and the rotation of the plate 223 with engagement pawl is restricted by engaging the engagement pawl 35 with the clutch ring 36. When the rotation of the plate 223 with engagement pawl is restricted, the rotation of the plate 230 with cam and the inner low speed carrier 415 is restricted, and the rotation which is the same direction as that of the central high speed crank 414 as the low speed rotation is output from the outer low speed ring 419 by the decelerating operation of the gear mechanism 413.

Meanwhile, similarly to Embodiments 1, 2, and 3, until the load becomes the low speed switching load and the high speed switching load which are set, the slider 26 is locked by the locking pins 31, 32 and holds the state, it can be prevented to become suddenly high speed state although a load is applied, and unstable operation such as the repetition of switching of the high speed and the low speed, and hence it is possible to accomplish stable and secure switching operation.

In addition, even in this embodiment, it is possible to apply the transmission to a hoisting machine having a large capacity by providing the decelerating gears 50, 51 in Embodiment 2 similarly.

Figure 23:
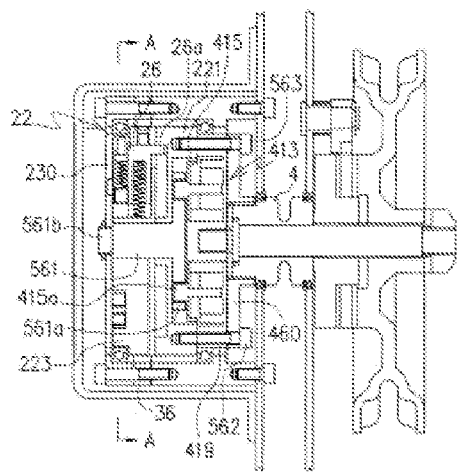
FIG. 23 is a sectional view showing a hoisting machine including a load sensing transmission according Embodiment 5 of the present invention.
Figure 24:
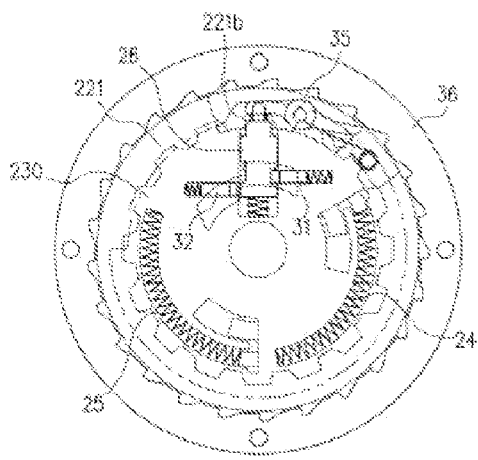
FIG. 24 is an operational view as viewed from A-A direction in case of no load and a high speed rotation.

FIG. 23 is a sectional view showing a load sensing transmission according to Embodiment 5 of the present invention, FIG. 24 is an operational view as viewed from A-A direction. This embodiment has a generally similar structure to Embodiment 4 mentioned above in which a part of the connection of the gear mechanism 413 and the load sensing mechanism 22 and so on is modified. That is to say, in this embodiment, first, the position of the load sensing mechanism 22 relative to the gear mechanism 413 is revered and the plate 221 with engagement groove is disposed between the gear mechanism 413 and the load sensing mechanism 22. After the disposition, the plate 221 with engagement groove and the outer low speed ring 419 are combined by bolts 562, 563, and connected by fitting the convex portion 415*a* of the inner low speed carrier 415 in a hole 561*a* of a joint 561. A shaft portion 561*b* of the joint 561 passes through the plate 221 with engagement groove and the plate 223 with engagement pawl, and on a leading end thereof, the plate 230 with cam is attached. Thereby, in Embodiment 4, the central high speed crank 414 of the gear mechanism 413 is connected to the plate 221 with engagement groove and the inner low speed carrier 415 is connected to the plate 230 with cam. However, in this embodiment, the outer low speed ring 419 of the gear mechanism 413 is connected to the plate 221 with engagement groove and the inner low speed carrier 415 is connected to the plate 230 with cam through the joint 561.

In Embodiment 5 having the modification as added, as mentioned above, if no load is applied or a light load is applied, and in case of the high speed rotation, the slider 26 of the load sensing mechanism 22 is in the state protruded outwardly as mentioned above, thereby the plate 223 with engagement pawl and the plate 221 with engagement groove are connected through the slider 26. At this time, the engagement pawl 35 is separated from the clutch ring 36 and disengaged. Therefore, the inner low speed carrier 415 and the outer low speed ring 419 are connected through the joint 561, the plate 230 with cam, the plate 223 with engagement pawl, the slider 26, and the plate 221 with engagement groove, and rotated integrally with the central high speed crank 414, and the rotation is output from the outer low speed ring 419 through the load outputting joint 460, as the high speed rotation.

In addition, when a load is applied to the load sheave 4, the outer low speed ring 419 and the inner low speed carrier 415 of the gear mechanism 413 are rotated. At this time, the relative rotation is generated between the outer low speed ring 419 and the inner low speed carrier 415. By this relative rotation, the relative rotation is generated between the plate 223 with engagement pawl and the plate 230 with cam connected to the inner low speed carrier 415 and the outer low speed ring 419, respectively, the load springs 24, 25 provided therebetween are compressed. Then, when the load becomes the low speed switching load, the slider 26 is in the inwardly retracted state, as mentioned above, the plate 223 with engagement pawl and the plate 221 with engagement groove are disengaged, and the rotation of the plate 223 with engagement pawl is restricted by engaging the engagement pawl 35 with the clutch ring 36. When the rotation of the plate 223 with engagement pawl is restricted, the rotation of the plate 230 with cam and the inner low speed carrier 415 is restricted, and the rotation which is the same direction as that of the central high speed crank 414 as the low speed rotation is output from the outer low speed ring 419 by the decelerating operation of the gear mechanism 413.

Meanwhile, similarly to Embodiments 1, 2, 3 and 4 as mentioned above, until the load becomes the low speed switching load and the high speed switching load which are set, the slider 26 is locked by the locking pins 31, 32 and holds the state, it can be prevented to become suddenly high speed state although a load is applied, and unstable operation such as the repetition of switching of the high speed and the low speed, and hence it is possible to accomplish stable and secure switching operation.

Figure 25:
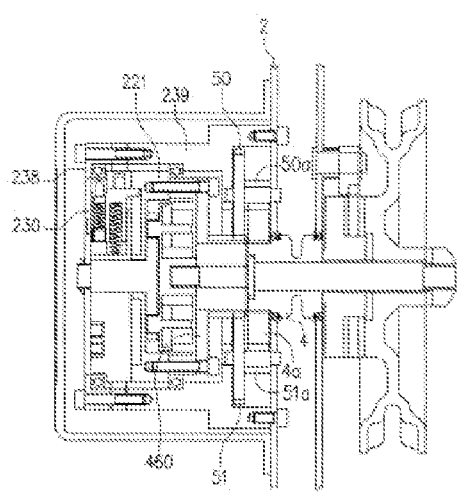
FIG. 25 is a sectional view showing a modified example of a part of the hoisting machine including the load sensing transmission shown in FIG. 23.

In addition, as shown in FIG. 25, even in this embodiment, it is possible to apply the transmission to a hoisting machine having a large capacity by providing the decelerating gears 50, 51 in Embodiment 2 similarly.

Meanwhile, in the foregoing embodiments, although the slider pin 27 biased by the pin spring 29 is used, it is possible to acquire the same advantageous effects even if a plate spring is used as a resilient member instead of the slider pin 27 and the pin spring 29. Moreover, the resilient member may not be provided on the slider 26, and may be provided on the plate 230 with cam or the cam portion thereof.

In addition, in the foregoing embodiments, if an angle to the radial direction is formed on both walls of the inner concave 21*b* or 221*b* of the ring 21 with engagement pawl or the plate 221 with engagement groove in order to perform further smoothly the switching between the high speed position and the low speed position of the slider 26, as shown in FIG. 4, FIG. 17 or FIG. 24, it is desirable to provide a large angle (about 10 to 45 degrees) on a side (right side of the concave portion in FIG. 4, left side of the concave portion 221b in FIG. 17, right side of the concave portion 221b in FIG. 24) contacting with the engagement portion 26a of the slider 26, particular, when a load is applied. This is because not only entrance and exit of the slider are easy by expanding the opening of the inner concaves 21b, 221b, but also the safety is ensured. That is to say, any obstructions, for example, the pin spring 29 breaks down, and if a force moving the slider radially and inwardly is not given to the slider 26 by the cam portion of the plate 30 with cam and the plate 230, even if there are detects that the slider 26 is not moved radially and inwardly, by inclining largely side walls of the inner concave portions 21b, 221b at a side being in contact with the slider 26 when a load is applied, it is possible to secure the safety by switching forcibly from the high speed to the low speed by pressing out the slider 26 with the side walls.

Although the load sensing transmission 11 in each of the embodiments is attached to the hoisting machine 1, the load sensing transmission is applicable to any device in which it is required that a variable speed is automatically performed depending on a load. For example, by attaching the load sensing transmission to an axle of a bicycle, when a load is large on a sloping road, the load sensing transmission increases a rotational torque at a low speed, and switches to a high speed rotation on an even road.

| DESCRIPTION OF REFERENCE NUMBERS |||||||
| --- | --- | --- | --- | --- | --- |
| 1 | hoisting machine | 2, 3 | frames | 4 | load sheave |
| 4a | load gear | 6 | pinion shaft | 7 | hand wheel |
| 8 | ratchet pawl | 9 | ratchet gear | 10a, 10b | break linings |
| 10 | break receiver | 11 | load sensing transmission | | |
| 12 | gear cover | 13 | planetary gear train | 14 | sun gear |
| 15, 16 | planetary carriers | 16a | convex portion | 17, 18 | planetary gears |
| 19 | internally-toothed ring gear | 20 | bolt | 21a, 21c | hole |
| 21b, 221b | inner concave | 21 | ring with engagement pawl | | |
| 22 | load sensing mechanism | 23 | plate with slider | | |
| 23a, 23b, 223a, 223b | load spring groove | | | | |
| 23c, 23d, 223c, 223d | stopper groove | 23e, 223e | slider groove | | |
| 23f, 23g, 223f, 223g | locking pin | 23h | concave portion | | |
| 23i | boss | 24, 25 | load spring | 26 | slider |
| 26a | engaging end | 26b | pin attaching hole | | |
| 26c, 26d | locking pin-engaging portion | 27 | slider pin | | |
| 28 | slider spring | 29 | pin spring | 30, 230 | plate with cam |
| 30a | hole | 30b, 30c, 230b, 230c | load spring pressing portion | | |
| 30d, 30e, 230d, 230e | stopper | 30f, 230f | unlocking groove | | |
| 30g, 30h, 230g, 230h | unlocking wall | 30i, 230i | outer edge portion | | |
| 30j, 230j | cam portion | 30k | connection portion | | |
| 31, 32 | locking pin | 33, 34 | locking pin spring | 35 | engagement pawl |
| 35a | pawl portion | 36 | clutch ring | 36a | clutch groove |
| 37 | pawl spring | 38 | outer shaft ring | 39 | inner shaft ring |
| 40, 41, 240, 241 | bolt | 50, 51 | decelerated gear | | |
| 50a, 51a | pinion gear | 221 | plate with engagement groove | | |
| 223 | plate with engagement pawl | 223x | small diametrical portion | | |
| 223y | large diametrical portion | 223j | slit portion | | |
| 223k | groove for engagement pawl | 223m | hole | | |
| 238, 239 | outer shaft ring | 260, 460 | load outputting joint | | |
| 260a, 561a | hole | 260b, 460b | connection portion | | |
| 261, 361, 561 | joint | 261a | hole | 261b, 361b, 561b | shaft portion |
| 262, 263, 462, 463, 562, 563 | bolt | 264, 265 | bearing | 401 | crank |
| 402 | planetary gear | 403 | sun inner gear | 404 | eccentric body |
| 405 | curved line plate | 405a | hole | 406 | inner pin |
| 407 | outer pin | 408 | outer ring | | |
| 413 | gear mechanism formed by internal contact-type planetary gear train or cycloidal gear train | | | | |
| 414 | central high speed crank | 415 | inner low speed carrier | | |
| 419 | outer low speed ring | | | | |

The invention claimed is:

1. A load sensing transmission that inputs an external rotation and outputs a low speed rotation or a high speed rotation switched depending on a high load or a low load, the load sensing transmission comprising:
a variable speed mechanism to decelerate the input external rotation and transmit it as a low speed or to transmit the same rotating speed as that of the input external rotation as a high speed;
a load sensing mechanism to sense a high load or a low load of an output side of the variable speed mechanism; and
a switching mechanism, which is driven by the load sensing mechanism, to switch an output rotation of the variable speed mechanism to a low speed state or a high speed state by engaging with or disengaging from the variable speed mechanism,
wherein the loadسensing mechanism includes a holding mechanism to maintain the high speed state until a load exceeds an upper limit of a predetermined load variation range when the load sensing mechanism senses a low speed switching load in case of the switching from the high speed to the low speed to switch the switching mechanism from the high speed state to the low speed state, and to maintain the low speed state until a load lowers below a lower limit of the load variation range when the load sensing mechanism senses a high speed switching load in case of the switching from the low speed to the high speed to switch the switching mechanism from the low speed state to the high speed state.

2. The load sensing transmission according to claim 1, wherein the variable speed mechanism includes a central rotation member that input the external rotation, and an inner rotation member and an outer rotation member that vary the rotation of the central rotation member, the central rotation member, the inner rotation member, and the outer rotation member being relative rotatable, in conjunction with the switching mechanism, if the rotation of one of the inner rotation member and the outer rotation member is restricted, a low speed rotation which has the same rotational direction as the central rotation member and which is lower than the central rotation member is output from the other of the inner rotation member and the outer rotation member, and if the rotational restriction of one of the outer rotation member and the inner rotation member is released, a high speed rotation which has the same rotational direction as the central rotation member and which has the same rotating speed as that of the central rotation member is output from the other of the inner rotation member and the outer rotation member.

3. The load sensing transmission according to claim 2, wherein the switching mechanism includes a rotational restriction-switching mechanism to switch the rotational restriction of the outer rotation member or the inner rotation member of the variable speed mechanism and the release of the rotational restriction, and a connection switching mechanism to switch any combination of the outer rotation member and the inner rotation member, the outer rotation member and the central rotation member, the central rotation member and the inner rotation member in an impossible relative rotation state by connecting them through the load sensing mechanism at the time of the release of the rotational restriction and in a possible relative rotation state by releasing the connection at the time of the rotational restriction.

4. The load sensing transmission according to claim 3, wherein the rotational restriction-switching mechanism includes an engagement pawl which integrally rotates with the outer rotation member or the inner rotation member of the variable speed mechanism and a clutch ring which has at a periphery thereof clutch grooves that engage with the engagement pawl and which is fixedly disposed outside the variable speed mechanism, wherein the engagement pawl is engaged with one of the clutch grooves or disengaged from the clutch grooves in conjunction with the connection switching mechanism, and wherein the rotation of the outer rotation member or the inner rotation member of the variable speed mechanism is restricted in at least one direction by the engagement of the engagement pawl and the clutch grooves, and the rotation of the outer rotation member or the inner rotation member of the variable speed mechanism is free in both directions by the disengagement of the engagement pawl and the clutch grooves.

5. The load sensing transmission according to claim 1, wherein the load sensing mechanism includes a slider to switch the switching mechanism, a pair of plate members which are provided together in a relatively rotatable state in a certain range and one or both of which are driven by the variable speed mechanism, and which are relatively rotated by an external load, a load resilient member which is provided between the pair of plate members and deformed by the relative rotation of the plate members, and a cam mechanism to place the slider in a movable state to a low speed switching position when the pair of plate members are relatively rotated by deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed.

6. The load sensing transmission according to claim 5, wherein the load sensing mechanism including a holding mechanism to hold a position of the slider, and wherein the holding mechanism includes a locking mechanism provided on one of the pair of plate members together with slider and locking the slider by engaging with slider when the slider arrives at the high speed switching position or at the low speed switching position, and an unlocking mechanism provided on the other of the pair of plate members and unlocking the locking mechanism and moving the slider to the low speed switching position or the high speed switching position, when the slider is in the movable state to the low speed switching position or the high speed switching position by the cam mechanism and a load exceeding the upper limit of the predetermined load variation range or lowering below the lower limit thereof.

7. The load sensing transmission according to claim 6, wherein one of the slider and the cam mechanism includes a resilient member in contact with the other of the slider and the cam mechanism, and capable of maintaining the holding of the slider by the holding mechanism in the predetermined load variation range while imparting a force capable of moving the slider in a radial direction to the slider by the resilient member.

8. The load sensing transmission according to claim 5, wherein the switching mechanism includes an inner concave portion provided to face the slider and in which the slider is movably inserted, and wherein side walls of the inner concave portion are set such that one side wall in contact with the slider due to a load is inclined significantly than the other side wall.

9. The load sensing transmission according to claim 1, wherein the variable speed mechanism includes a central rotation member to input the external rotation, and an inner rotation member and an outer rotation member which change a speed of the rotation of the central rotation member, the central rotation member, the inner rotation member, and the outer rotation member being relatively rotated to each other, wherein the low speed rotation which has a rotating speed lower than that of the central rotation member and is the same rotational direction as that of the central rotation member is output from the inner rotation member when the rotational restriction of the outer rotation member is performed, and the high speed rotation which is the same rotating speed as that of the central rotation member and is the same rotational direction as that of the central rotation member is output from the inner rotation member when the rotational restriction is released, wherein the load sensing mechanism includes a pair of plate members which are provided together in a relatively rotatable state in a certain range and relatively rotated when one of the plate members is driven by the inner rotation member of the variable speed mechanism and the exterior load is applied to the other of the plate member, a load resilient member which is provided between the pair of plate members, transmits the rotation of one of the plate members to the other of the plate members, and deformed by the relative rotation of the plate members, a slider which is provided on one of the plate members and is radially movable, and a cam mechanism which is provided on a plate member facing the plate member with slider and configured to place the slider in a movable state to a low speed switching position when the pair of plate members are relatively rotated while deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed, and wherein the switching mechanism performs the rotational restriction of the outer rotation member together with disengaging the connection of the inner rotation member and the outer rotation member when the slider is moved to the low speed switching position, and releases the rotational restriction of the outer rotation member together with performing the connection of the inner rotation member and the outer rotation member through the load sensing mechanism when the slider is moved to the high speed switching position.

10. The load sensing transmission according to claim 1, wherein the variable speed mechanism includes a central rotation member to input the external rotation, and an inner rotation member and an outer rotation member which change a speed of the rotation of the central rotation member, the central rotation member, the inner rotation member, and the outer rotation member being relatively rotated to each other, wherein the low speed rotation which has a rotating speed lower than that of the central rotation member and is the same rotational direction as that of the central rotation member is output from the inner rotation member when the rotational restriction of the outer rotation member is performed, and the high speed rotation which is the same rotating speed as that of the central rotation member and is the same rotational direction as that of the central rotation member is output from the inner rotation member when the rotational restriction is released, wherein the load sensing mechanism includes a pair of plate members which are provided together in a relatively rotatable state in a certain range, one of the plate members being driven by the outer rotation member of the variable speed mechanism and the other being engaged with or disengaged from the inner rotation member, and the plate members being relatively rotated by the relative rotation of the outer rotation member and the inner rotation member generated by an exterior load, a load resilient member which is provided between the pair of plate members, transmits the rotation of one of the plate members to the other of the plate members, and deformed by the relative rotation of the plate members, a slider which is provided on a plate member facing the plate member driven by the outer rotation member and is radially movable, and a cam mechanism which is provided on the plate members driven by the outer rotation member and configured to place the slider in a movable state to a low speed switching position when the pair of plate members are relatively rotated while deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed, and wherein the switching mechanism performs the rotational restriction of the outer rotation member together with disengaging the connection of the inner rotation member and the outer rotation member when the slider is moved to the low speed switching position together with performing the rotational restriction of the outer rotation member and performs the connection of the inner rotation member and the outer rotation member through the load sensing mechanism when the slider is moved to the high speed switching position.

11. The load sensing transmission according to claim 1, wherein the variable speed mechanism includes a central rotation member to input the external rotation, and an inner rotation member and an outer rotation member which change a speed of the rotation of the central rotation member, the central rotation member, the inner rotation member, and the outer rotation member being relatively rotated to each other, wherein the low speed rotation which has a rotating speed lower than that of the central rotation member and is the same rotational direction as that of the central rotation member is output from the inner rotation member when the rotational restriction of the outer rotation member is performed, and the high speed rotation which is the same rotating speed as that of the central rotation member and is the same rotational direction as that of the central rotation member is output from the inner rotation member when the rotational restriction is released, wherein the load sensing mechanism includes a pair of plate members which are provided together in a relatively rotatable state in a certain range, one of the plate members being driven by the outer rotation member of the variable speed mechanism and the other being engaged with or disengaged from the central rotation member, and the plate members being relatively rotated by the relative rotation of the outer rotation member and the central rotation member generated by an exterior load, a load resilient member which is provided between the pair of plate members, transmits the rotation of one of the plate members to the other of the plate members, and deformed by the relative rotation of the plate members, a slider which is provided on a plate member facing the plate member driven by the outer rotation member and is radially movable, and a cam mechanism which is provided on a plate member driven the outer rotation member and configured to place the slider in a movable state to a low speed switching position when the pair of plate members are relatively rotated while deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed, and wherein the switching mechanism performs the rotational restriction of the outer rotation member together with disengaging the connection of the central rotation member and the outer rotation member when the slider is moved to the low speed switching position, and releases the rotational restriction of the outer rotation member together with performing the connection of the center rotation member and the outer rotation member through the load sensing mechanism when the slider is moved to the high speed switching position.

12. The load sensing transmission according to claim 1, wherein the variable speed mechanism includes a central rotation member to input the external rotation, and an inner rotation member and an outer rotation member which change a speed of the rotation of the central rotation member, the central rotation member, the inner rotation member, and the outer rotation member being relatively rotated to each other, wherein the low speed rotation which has a rotating speed lower than that of the central rotation member and is the same rotational direction as that of the central rotation member is output from the outer rotation member when the rotational restriction of the inner rotation member is performed, and the high speed rotation which is the same rotating speed as that of the central rotation member and is the same rotational direction as that of the central rotation member is output from the outer rotation member when the rotational restriction is released, wherein the load sensing mechanism includes a pair of plate members which are provided together in a relatively rotatable state in a certain range, one of the plate members is driven by the inner rotation member of the variable speed mechanism and the other of the plate members being engaged with or disengaged from the central rotation member, and the plate members being relatively rotated by the relative rotation of the inner rotation member and the central rotation member generated by an exterior load applied, a load resilient member which is provided between the pair of plate members, transmits the rotation of one of the plate members to the other of the plate members, and deformed by the relative rotation of the plate members, a slider which is provided on a plate member facing the plate member driven by the inner rotation member and is radially movable, and a cam mechanism which is provided on a plate member driven by the inner rotation member and configured to place the slider in a movable state to a low speed switching position when the pair of plate members are relatively rotated while deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed, and wherein the switching mechanism performs the rotational restriction of the inner rotation member together with disengaging the connection of the inner rotation member and the central rotation member when the slider is moved to the low speed switching position, and releases the rotational restriction of the inner rotation member together with performing the connection of the inner rotation member and the central rotation member through the load sensing mechanism when the slider is moved to the high speed switching position.

13. The load sensing transmission according to claim 1, wherein the variable speed mechanism includes a central rotation member to input the external rotation, and an inner rotation member and an outer rotation member which change a speed of the rotation of the central rotation member, the central rotation member, the inner rotation member, and the outer rotation member being relatively rotated to each other, wherein the low speed rotation which has a rotating speed lower than that of the central rotation member and is the same rotational direction as that of the central rotation member is output from the outer rotation member when the rotational restriction of the inner rotation member is performed, and the high speed rotation which is the same rotating speed as that of the central rotation member and is the same rotational direction as that of the central rotation member is output from the outer rotation member when the rotational restriction is released, wherein the load sensing mechanism includes a pair of plate members which are provided together in a relatively rotatable state in a certain range, one of the plate members being driven by the inner rotation member of the variable speed mechanism and the other being engaged with or disengaged from the outer rotation member, and the plate members being relatively rotated by the relative rotation of the inner rotation member and the outer rotation member generated by an exterior load applied, a load resilient member which is provided between the pair of plate members, transmits the rotation of one of the plate members to the other of the plate members, and deformed by the relative rotation of the plate members, a slider which is provided on a plate member facing the plate member driven by the inner rotation member and is radially movable, and a cam mechanism which is provided on a plate member of the plate members driven by the inner rotation member and configured to place the slider in a movable state to a low speed switching position when the pair of plate members are relatively rotated while deforming the load resilient member by a low speed switching load at the time of the switching from the high speed to the low speed, and to place the slider in a movable state to a high speed switching position when the pair of plate members are relatively rotated in an opposite direction to each other by restoring the load resilient member by a high speed switching load at the time of the switching from the low speed to the high speed, and wherein the switching mechanism performs the rotational restriction of the inner rotation member together with disengaging the connection of the inner rotation member and the outer rotation member when the slider is moved to the low speed switching position, and releases the rotational restriction of the inner rotation member together with performing the connection of the inner rotation member and the outer rotation member through the load sensing mechanism when the slider is moved to the high speed switching position.

14. A hoisting machine, comprising:

a hand wheel rotated by an operation of a hand chain;

a load sheave to perform up and down movement of a load chain suspending a load;

a variable speed mechanism to which a rotation of the hand wheel is transmitted and which decelerates the rotation to transmit as a low speed rotation, or transmits the same rotating speed as that of hand wheel as a high speed rotation;

a load sensing mechanism to sense a high load or a low load applied to the load sheave by a rotational output of the variable speed mechanism;

a switching mechanism driven by the load sensing mechanism and configured to switch the output rotation of the variable speed mechanism to the low speed state or the high speed state by engaging with or disengaging from the variable speed mechanism, wherein the load sensing mechanism includes a holding mechanism to maintain the high speed state until a load exceeds an upper limit of a predetermined load variation range when the load sensing mechanism senses a low speed switching load in case of the switching from the high speed to the low speed to switch the switching mechanism from the high speed state to the low speed state, and to maintain the low speed state until a load lowers below a lower limit of the load variation range when the load sensing mechanism senses a high speed switching load in case of the switching from the low speed to the high speed to switch the switching mechanism from the low speed state to the high speed state.

15. The hoisting machine according to claim 14, further comprising speed reduction gears provided between the load sheave and the variable speed mechanism.

* * * * *